US010559269B2

(12) United States Patent
Hirotsune

(10) Patent No.: US 10,559,269 B2
(45) Date of Patent: Feb. 11, 2020

(54) VIEWING POSITION ADAPTING MULTI-PANEL ELECTRONIC DISPLAY DEVICE

(71) Applicant: Panasonic Liquid Crystal Display Co., Ltd., Himeji-shi, Hyogo (JP)

(72) Inventor: Satoshi Hirotsune, Hyogo (JP)

(73) Assignee: Panasonic Liquid Crystal Display Co., Ltd., Hyogo (JP)

(*) Notice: Subject to any disclaimer, the term of this patent is extended or adjusted under 35 U.S.C. 154(b) by 39 days.

(21) Appl. No.: 15/941,956

(22) Filed: Mar. 30, 2018

(65) Prior Publication Data

US 2019/0304381 A1 Oct. 3, 2019

(51) Int. Cl.

| | |
|---|---|
| ***G09G 3/36*** | (2006.01) |
| ***G06T 11/00*** | (2006.01) |
| ***G06T 1/20*** | (2006.01) |
| ***G06T 5/00*** | (2006.01) |
| ***H04N 1/60*** | (2006.01) |
| ***H04N 1/56*** | (2006.01) |
| ***H04N 5/202*** | (2006.01) |
| ***H04N 5/57*** | (2006.01) |
| ***H04N 9/64*** | (2006.01) |

(52) U.S. Cl.

CPC ..... *G09G 3/3607* (2013.01); *G09G 2300/023* (2013.01); *G09G 2320/066* (2013.01); *G09G 2320/0666* (2013.01); *G09G 2320/08* (2013.01)

(58) Field of Classification Search

CPC combination set(s) only.
See application file for complete search history.

(56) References Cited

U.S. PATENT DOCUMENTS

| | | | | |
|---|---|---|---|---|
| 8,451,201 | B2 | 5/2013 | Hirata et al. | |
| 2007/0262985 | A1* | 11/2007 | Watanabe | G06T 5/008 345/420 |
| 2010/0289819 | A1* | 11/2010 | Singh | G09G 3/003 345/619 |
| 2013/0201176 | A1* | 8/2013 | Lee | G09G 5/003 345/214 |
| 2016/0170702 | A1* | 6/2016 | Jiang | G02F 1/133528 345/618 |
| 2017/0255819 | A1 | 9/2017 | Aoki et al. | |
| 2018/0059465 | A1* | 3/2018 | Koudo | G09G 3/3648 |
| 2018/0286325 | A1* | 10/2018 | Koudo | G09G 3/3607 |
| 2018/0286339 | A1* | 10/2018 | Koudo | G09G 3/3677 |
| 2019/0041642 | A1* | 2/2019 | Haddick | G02B 27/0172 |
| 2019/0199993 | A1* | 6/2019 | Babu | H04N 13/122 |

* cited by examiner

*Primary Examiner* — Wesner Sajous

(74) *Attorney, Agent, or Firm* — Hamre, Schumann, Mueller & Larson, P.C.

(57) ABSTRACT

An electronic display device includes a first display panel and a second display panel that are positioned in a stacked configuration. Each of the first display panel and second display panel has pixels. An image processing unit of the electronic display device is configured to generate color image data for the first display panel or contrast image data for the second display panel by applying an expansion based on a viewing position. A method of displaying an image on an electronic display device includes generating color image data and generating contrast image data. One of generating color image data or generating contrast image data includes an expansion based on a viewing position.

17 Claims, 14 Drawing Sheets

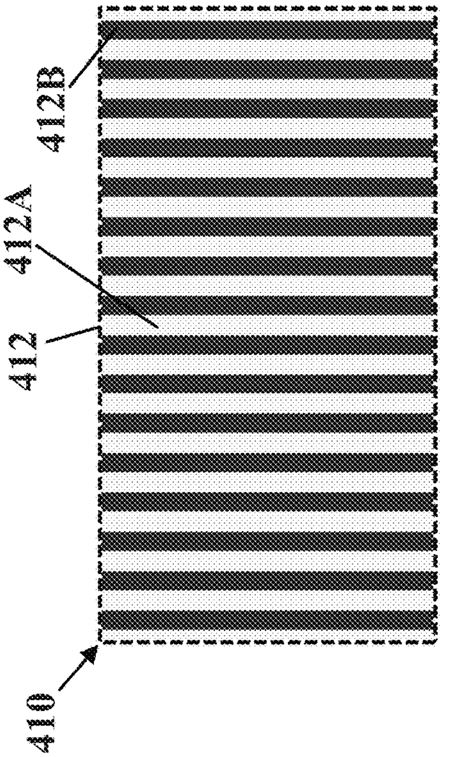
Figure 7B
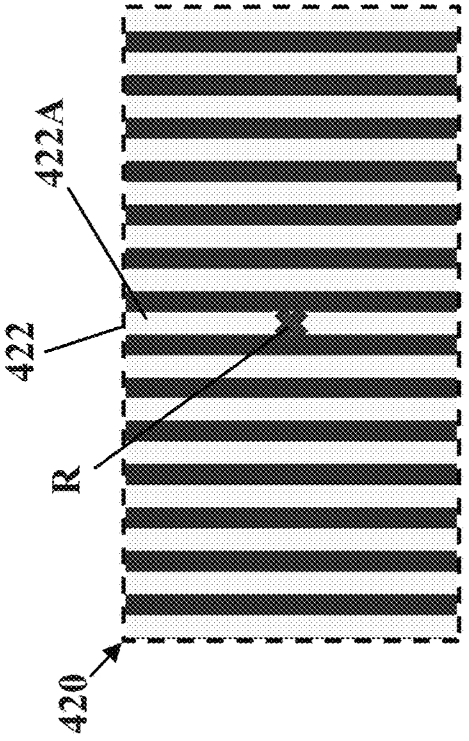
Figure 7C
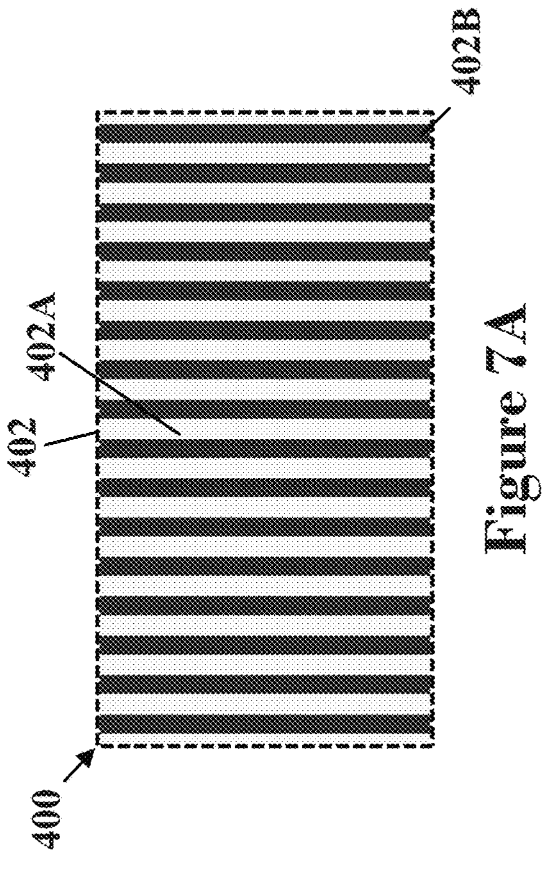
Figure 7A
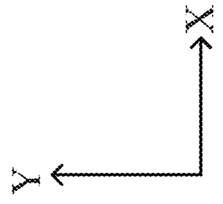

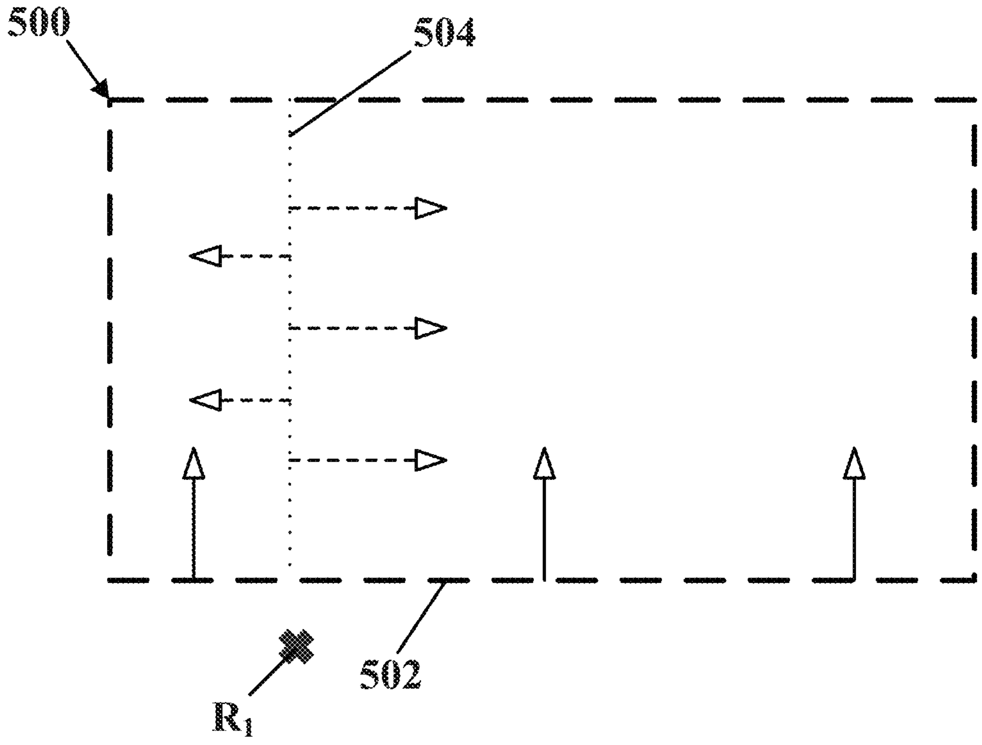
Figure 9
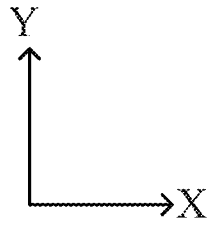

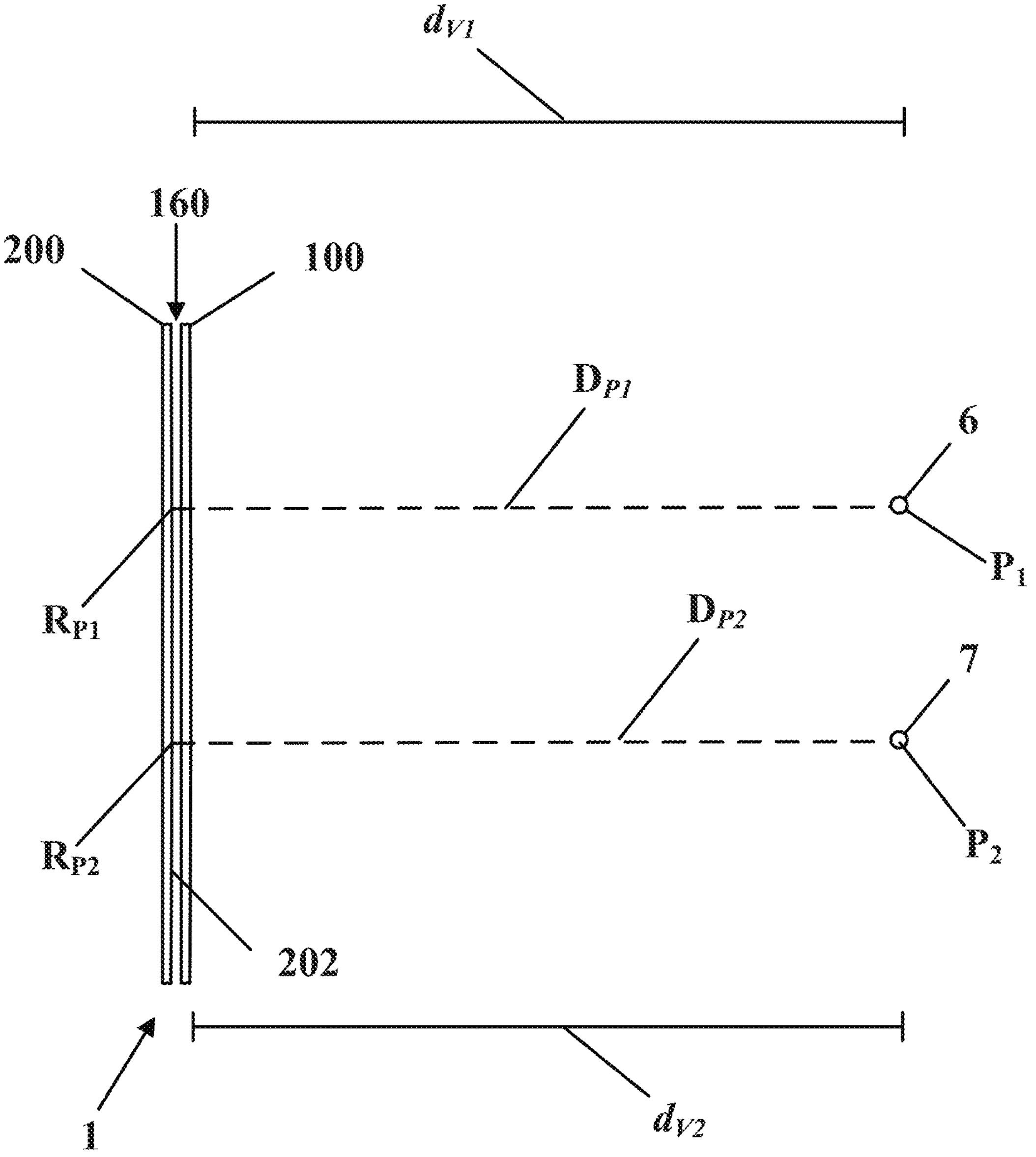
Figure 12
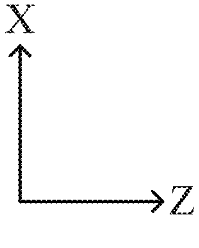

VIEWING POSITION ADAPTING MULTI-PANEL ELECTRONIC DISPLAY DEVICE

FIELD

This disclosure relates to electronic display devices for displaying an image utilizing two or more display panels.

BACKGROUND

An electronic display device displays an image by providing pixels that form the image. Each pixel of the displayed image is formed by light filtered by a set of corresponding pixels formed in display panels of the electronic display device. Each set of corresponding pixel in each display panel filters light so that the pixels of the displayed image have properties (e.g., color, brightness, saturation) that match the desired image.

BRIEF SUMMARY

A display device can include a first display panel having color pixels, a second display panel having contrast pixels, and an image processing unit. The color pixels and contrast pixels are positioned so that each of the color pixels overlaps with at least one contrast pixel in a plan view. The image processing unit generates color image data for controlling the color pixels and contrast image data for controlling the contrast pixels. One of the color image data and the contrast image data is generated based on a position of the person viewing the display device. The utilization of the position of the person viewing the display device can ensure those color pixels and contrast pixels that are aligned when viewed from the person's specific position form the desired image.

In an embodiment, a display device includes a first display panel and a second display panel that are positioned in a stacked configuration. The first display panel has color pixels and the second display panel has contrast pixels. Each of the color pixels overlaps with at least one of the contrast pixels in a plan view. The liquid crystal display device also includes an image processing unit that generates color image data for the first display panel and contrast image data for the second display panel. The generation of one of the color image data or the contrast image data includes applying an expansion based on the viewing position to the external input image data. The display device controls the color pixels according to the color image data and the contrast pixels according to the contrast image data.

In an embodiment, a display device includes a first display panel and a second display panel that are positioned in a stacked configuration. The first display panel has color pixels and the second display panel has contrast pixels. The number of color pixels in the first display panel is equal to the number of contrast pixels in the second display panel. The liquid crystal display device also includes an image processing unit that generates color image data for the first display panel and contrast image data for the second display panel. The color image data and contrast image data are generated by the image processing unit based on external input image data that is received by the image processing unit. The generation of the color image data or the contrast image data includes applying an expansion based on the viewing position to the external input image data. The display device controls the color pixels according to the color image data forming a contrast image and the contrast pixels according to the contrast image data forming a color image.

The external input image data includes edge image data that corresponds to a portion of the image to be displayed that is along an edge of display device. The one of the color image and the contrast image that was generated utilizing the expansion based on the viewing position does not include a portion based on the edge image data, and the other one of the color image and the contrast image does include a portion based on the edge image data.

In an embodiment, a display device includes a first display panel and a second display panel that are positioned in a stacked configuration. The first display panel has color pixels and the second display panel has contrast pixels. In an embodiment, a method of displaying an image on the display device includes generating color image data, generating contrast image data, and controlling the color pixels according to the color image data and the contrast pixels according to the contrast image data. Either generating the contrast image data or generating color image data includes applying an expansion based on a viewing position to the external input image data.

BRIEF DESCRIPTION OF THE DRAWINGS

Both described and other features, aspects, and advantages of a display device and method of displaying an image on a display device will be better understood with reference to the following drawings:

FIGS. 7A-7C illustrate how an image is utilized by color pixels in a front display panel and by contrast pixels in a back display panel in an embodiment.

FIG. 9 illustrates a schematic diagram of a display area of a back display area in an embodiment of an electronic display device.

FIG. 12 is a schematic diagram showing an electronic display device and two people viewing the electronic display device in an embodiment.

Like reference numbers represent like parts throughout.

DETAILED DESCRIPTION

An electronic display device may be in the form of a liquid crystal electronic display ("LCD") device. The principles explained and described herein for an LCD electronic display device can be applied to other types of electronic display devices. For example, other types of electronic display devices may include light emitting diode ("LED") display devices or organic light emitting diode ("OLED") display devices. The electronic display device includes multiple display panels. For example, an electronic display device is constructed to have a first display panel and a second display panel. A first display panel may have pixels that filter color for the pixels of the displayed image. A second display panel may have pixels that filter the amount of light (e.g., intensity) for the pixels of the displayed image. The pixels in the first display panel that filter color may be referred to as color pixels. The pixels in the second display panel that filter light intensity may be referred to as contrast pixels. The displayed image is formed of pixels resulting from light that travels through the pixels in the first display panel and the pixels in the second display panel.

A controller in the electronic display device controls each set of overlapping pixels in the display panels to produce the displayed image. The controller may include an image processing unit to process image data provided to the electronic display device. There may be a gap between pixels in the first display panel and second display panel that overlap in a plan view (e.g., overlap in the normal viewing direction of the electronic display device). This gap may be due to the components of the display panels and/or other components that are positioned between the two display panels. This gap can cause, in part, a position of a person viewing the electronic display device to affect which pixels of the display panels overlap. This can cause the image displayed by the electronic display device to be different depending upon the position of the person viewing the image.

Embodiments provided describe an electronic display device including a front display panel 100 having a plurality of pixels, a back display panel 200 have a plurality of pixels, and an image processing unit. In an embodiment, one of the pixels in the front display panel 100 and one of the pixels in the back display 200 panel overlap when viewed from a position of a person viewing the electronic display device. Said overlapping pixels may not overlap when the electronic display device is viewed in a normal viewing direction. The image processing unit may generate image data for controlling the plurality of pixels in the front display panel 100 and image data for controlling the plurality of pixels in the back display panel 200. The image processing unit may generate the image data for controlling the plurality of pixels in the back display panel 200 based on a position of a person viewing the electric display device.

Figure 1:
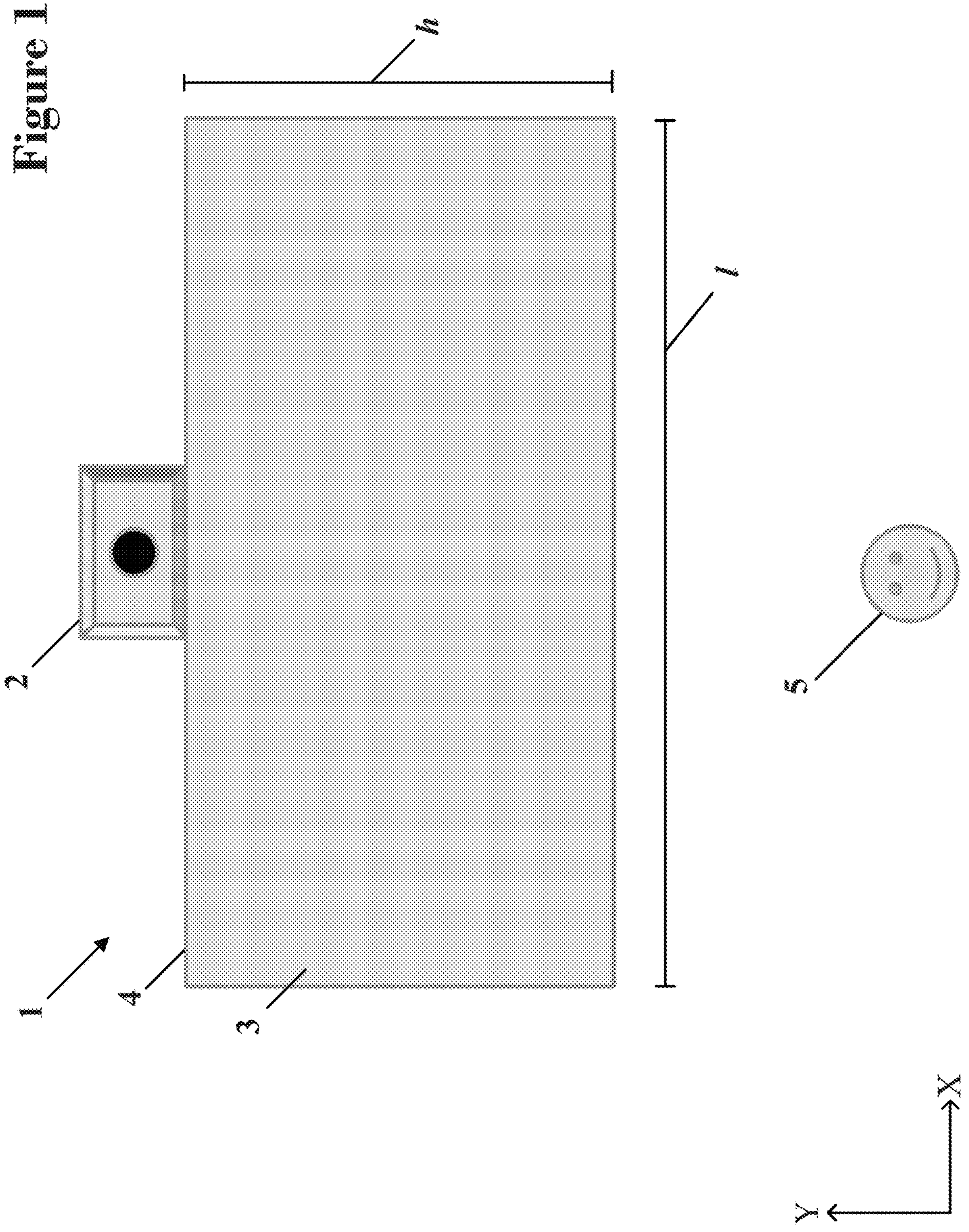
FIG. 1 shows a person viewing the electronic display device in an embodiment.

FIG. 1 illustrates an electronic display device 1 and a person 5 viewing the electronic display device 1 in an embodiment. The electronic display device 1 includes a camera 2 and a viewing surface 3 that displays an image. The electronic display device 1 has a length l that extends in a first direction (e.g., the X direction in FIG. 1) and a height h that extends in a second direction (e.g., the Y direction in FIG. 1). The first direction is at or about perpendicular to the second direction in an embodiment. The electronic display device 1 includes display panels 4 that are in a stacked configuration in a third direction that is perpendicular to both the length l and the height h of the electronic display device 1. This third direction may also be referred to as a viewing direction or Z direction in some embodiments. A view of the display panels 4 of the viewing surface 3 along the viewing direction may be a plan view in an embodiment.

Figure 2:
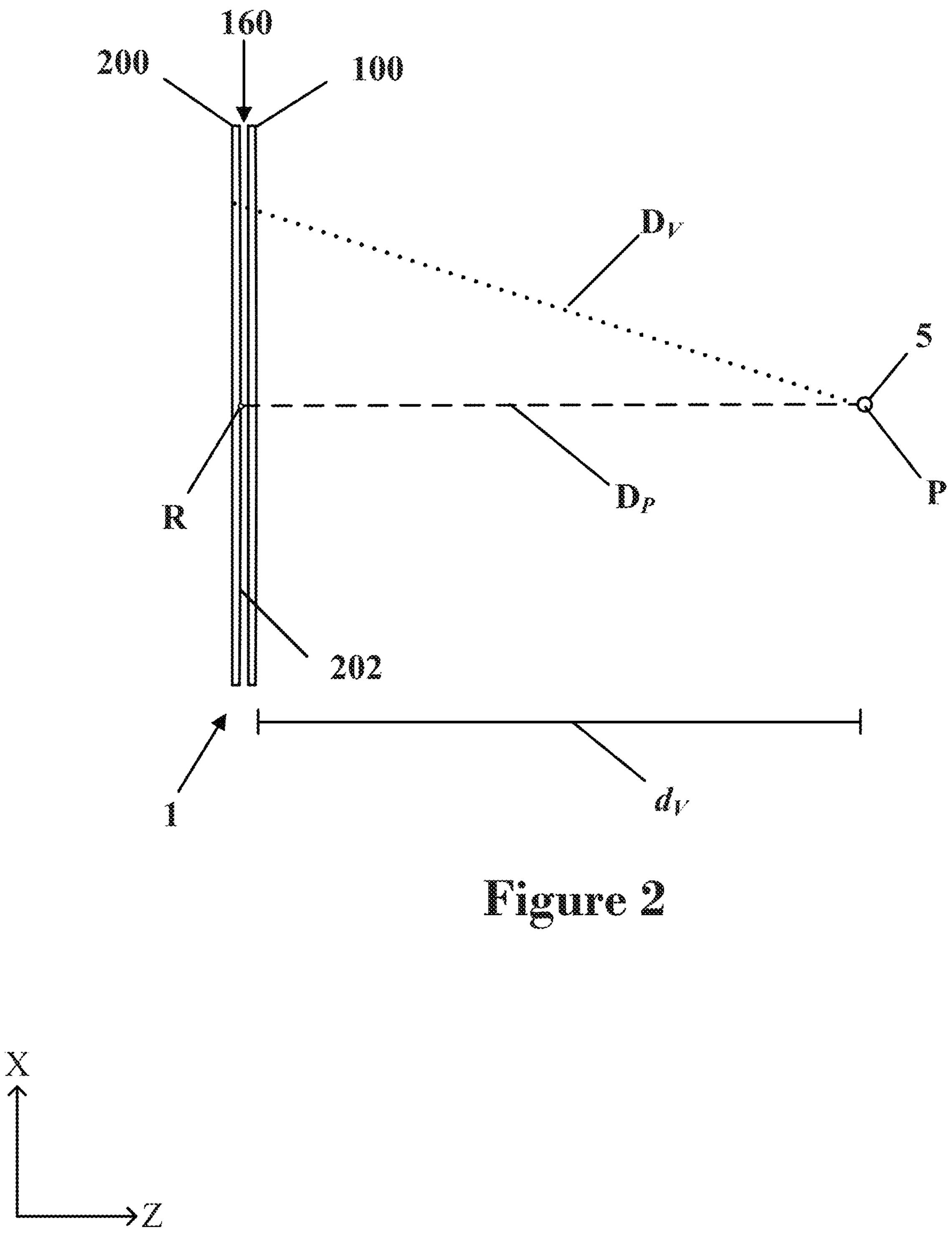
FIG. 2 is a schematic diagram showing an electronic display device and a person viewing the electronic display device in an embodiment.

FIG. 2 is a schematic diagram illustrating the display panels 4 of the electronic display device 1 and a position P of the person 5 viewing the electronic display device 1 shown in FIG. 1. In an embodiment, the position P may be the position of the viewpoint of the person 5. Accordingly, the position P may be determined based on the eye position of the person 5 relative to the electronic display device 1. The position P may be described as the viewing position P in an embodiment.

As shown in FIG. 2, the display panels 4 of the electronic display device 1 include the front display panel 100 and the back display panel 200. The front display panel 100 is closer to the person 5 viewing the electronic display device 1 than the back display panel 200. However, in an embodiment, the electronic display device 1 may include more than two display panels. In an embodiment, the front display panel 100 and the back display panel 200 as described below may be reversed relative to the viewer. In such an embodiment, generation of the contrast data utilizing a viewing position P described below may be applied to the image data for the panel farther away from the viewer (e.g., the front panel that is now farther away from the viewer than the back panel). For example, in an embodiment, the described generation of the contrast data utilizing a viewing position would be utilized for generating the color data instead of the contrast data. In such an embodiment, generation of the color data would include the expansion based on a viewing position, while the generation of the contrast data would not include the expansion based on the viewing position. The front display panel 100 and the back display panel 200 are separated by a gap 160. In an embodiment, this gap 160 may be formed by the components of the display panels 100, 200 and/or other components that are positioned between the two display panels 100, 200.

Figure 3:
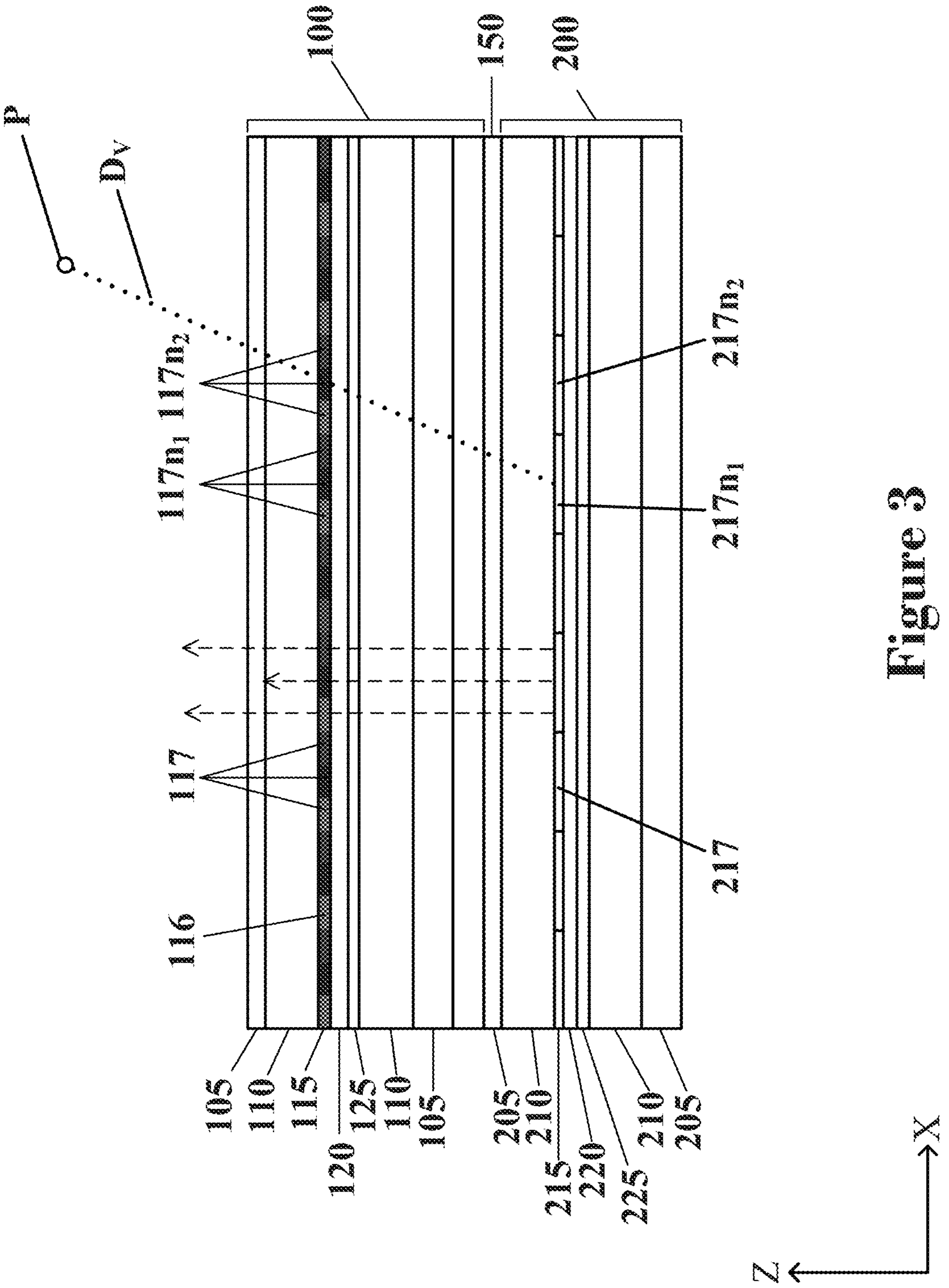
FIG. 3 shows the component layers of the display panels of the electronic display device of FIG. 2 in an embodiment.

FIG. 3 shows a cross section of the front display panel 100 and the back display panel 200 in an embodiment. In particular, FIG. 3 shows component layers of the front display panel 100 and the back display panel 200 in an embodiment. The back display panel 200 is affixed to the front display panel 100 so that the display panels 100, 200 are in a stacked configuration in the viewing direction. A viewing direction may be a direction along the Z axis in FIG. 3. A diffuser 150 may be provided between the front display panel 100 and the back display panel 200. The diffuser 150 may be provided as a sheet or an adhesive layer.

Each display panel 100, 200 is composed of a series of layered components. In an embodiment, the front display panel 100 includes a pair of polarizers 105, a pair of substrates 110, a color filter layer 115, a liquid crystal layer 120, and a thin film transistor ("TFT") layer 125. Each of the polarizers 105 and substrates 110 may be provided as a sheet or layer. The color filter layer 115, liquid crystal layer 120, and TFT layer 125 are sandwiched between the pair of substrates 110 and the pair of polarizers 105. The substrates 110 are located between the polarizers 105. The color filter layer 115 includes subpixels 116. The subpixels 116 are each configured to filter a specific color of light. Each subpixel 116 only allows its specific color of light to pass through. For example, the subpixels 116 in FIG. 3 filter red, blue, or green light. The different colored subpixels 116 repeat along the row of subpixels 116. Each adjacent red, green, and blue colored subpixel 116 forms a pixel 117 of the front display panel 100. The pixels 117 may be referred to as color pixels as they filter color. It should be appreciated that the subpixels 116 are not limited to red, green, and blue. In an embodiment, one or more of the subpixels 116 may filter other colors including white. A color pixel 117 in an embodiment may include two or more subpixels 116 with two or more different colors. In an embodiment, a color pixel 117 may include four subpixels 116 that filter red, green, blue, and yellow light, respectively. In an embodiment, the color filter layer 115 may include a black matrix (not shown) between adjacent subpixels to prevent light from mixing between subpixels 116 while in the color filter layer 115.

Each polarizer 105 only allows a light of a single orientation to pass through. The liquid crystal layer may change the orientation of the light passing through. Following known principles of liquid crystal displays, the TFT layer 125 is configured to apply an electric field to the liquid crystal layer 120 to control how much of the light is reoriented. The liquid crystal layer 120 is controlled to allow a specific amount (include all of or none) of the passing light to have the same orientation as the outer polarizer 105. The TFT layer 125 may specifically control each portion of the liquid crystal layer 120 along each subpixel 116. Accordingly, the liquid crystal layer 120 may be controlled to allow a specific amount of the light filtered by each subpixel 116 to pass through the outer polarizer 105. Red light from a red subpixel 116, green light from a green subpixel 116, and blue light from a blue subpixel 116 combine to provide the light filtered by a color pixel 117. Thus, the subpixels 116 of each color pixel 117 are controlled so that each color pixel 117 displays the appropriate color for displaying the desired image.

The back display panel 200 in an embodiment includes a pair of polarizers 205, a pair of substrates 210, a contrast filter layer 215, a liquid crystal layer 220, and a TFT layer 225. Each of the polarizers 205 and substrates 210 may be provided as a sheet or layer. The contrast filter layer 215, liquid crystal layer 220, and TFT layer 225 are sandwiched between the pair of polarizers 205 and the pair of substrates 210. The substrates 210 are located between the polarizers 205. The polarizers 205, liquid crystal layer 220, and TFT layer 225 of the back display panel 200 may function in a similar manner as described with respect to the front display panel 100. The contrast filter layer 215 includes pixels 217. The pixels 217 of the contrast filter layer 215 filter the intensity (e.g., amount) of light instead of filtering the color of light. The pixels 217 (utilizing the liquid crystal layer 220 and TFT layer 225) filter a light's intensity without modifying the light's color and may be referred to as contrast pixels. As illustrated by the dashed lines in FIG. 3, each of the contrast pixels 217 in the back display panel 200 is configured to provide a specific amount of light to one of the color pixels 117 in the front display panel 100. As shown in FIG. 3, each of the color pixels 117 overlaps with at least one of the contrast pixels 217 in the viewing direction in an embodiment. The number of color pixels 117 may be equal to the number of contrast pixels 217 in an embodiment. In such embodiments, each of the contrast pixels 217 may be configured to provide a specific amount of light to a respective one of the color pixels 117. FIG. 3 shows a portion of a single row of color pixels 117 and a single row of contrast pixels 217. In an embodiment, the front display panel 100 would have multiple rows of color pixels 117 and the back display panel 200 would have multiple rows of contrast pixels 217. In such an embodiment, the color pixels 117 may be arranged in a matrix in X and Y directions in the front display panel 100 and the contrast pixels 217 may be arranged in a matrix in the X and Y directions in the back display panel 200.

A contrast pixel 217 in an embodiment may be configured to provide light for a color pixel 117 that overlaps in a viewing direction. In such an embodiment, the contrast pixel 217$n_1$ is configured to provide filtered light for color pixel 117$n_1$ and contrast pixel 217$n_2$ is configured to provide light for color pixel 117$n_2$. The dotted line in FIGS. 2 and 3 illustrates the direction $D_V$ at which the person 5 in the viewing position P would view the color pixel 117$n_2$. As shown by viewed direction $D_V$, the person 5 in the viewing position P would view light filtered by color pixel 117$n_2$ and contrast pixel 217$n_1$. Thus, when the electronic display device 1 is viewed from viewing position P, a pixel of the displayed image would be incorrect as the light for color pixel 117$n_2$ is provided by contrast pixel 217$n_1$.

The back display panel 200 shown in FIG. 3 is a liquid crystal display panel. A light source (not shown) may be provided to the rear of the back display panel 200 in an embodiment, so that the back display panel 200 is positioned between the light source and the front display panel 100. In such an embodiment, the light source provides non-filtered light to the back display panel 200. For example, the light source may be a backlight. However, it should be appreciated that the back display panel 200 may be configured to provide the filtered light without a light source. For example, the back display panel 200 in an embodiment may be a LED or OLED display panel that includes pixels that generate filtered light (e.g., light at a specific intensity) for the color pixels 117 without a light source.

Figure 4B:
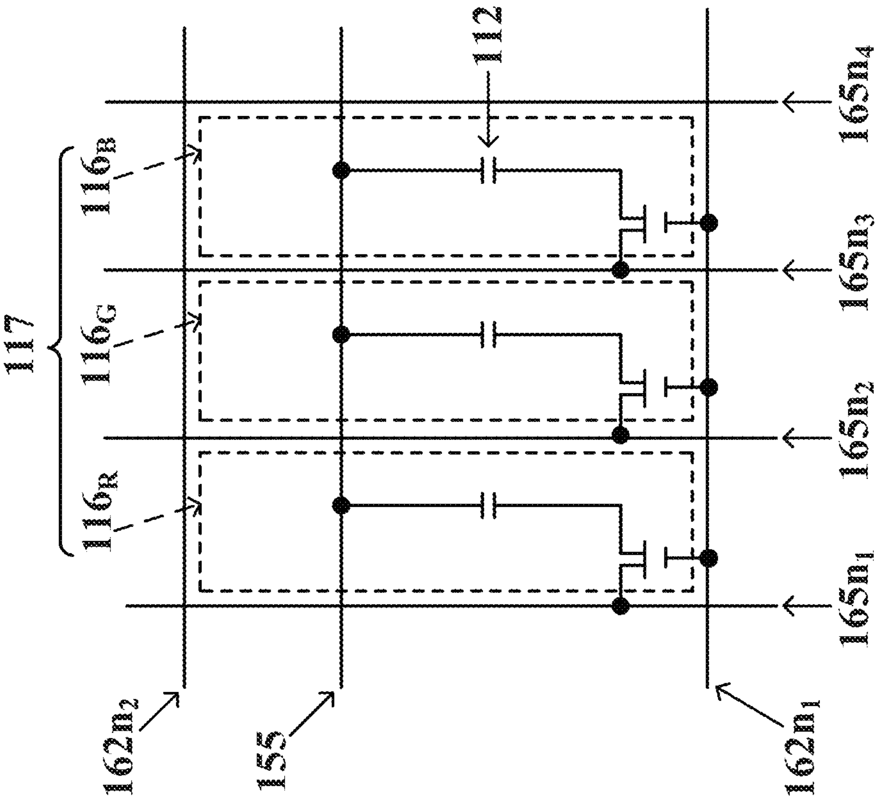
FIGS. 4A and 4B are schematic diagrams showing a color pixel in a front display panel and a corresponding contrast pixel in a back display panel in an embodiment.
Figure 4A:
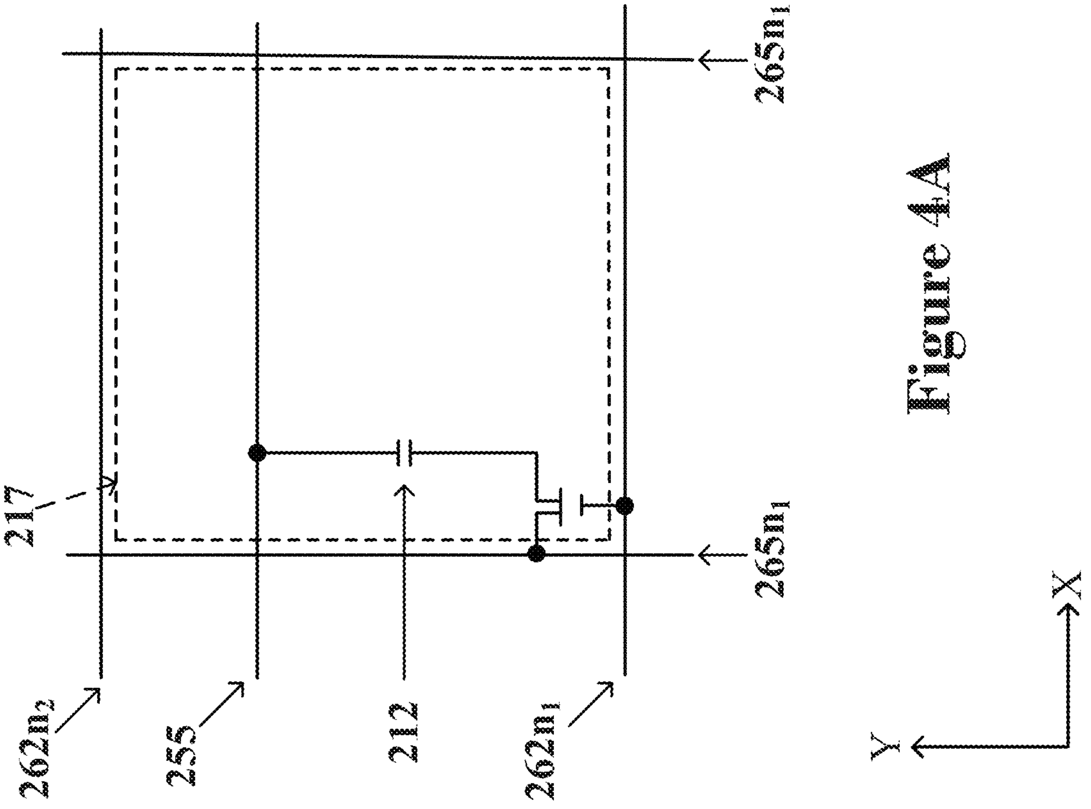

FIG. 4A is a schematic diagram showing a contrast pixel 217 in the back display panel 200 in an embodiment. FIG. 4B is a schematic diagram showing a corresponding color pixel 117 in the front display panel 100 in an embodiment. Referring to FIG. 4A, a contrast pixel 217 has an area that is approximately defined by an adjacent pair of gate lines 262$n_1$, 262$n_2$ and an adjacent pair of source lines 265$n_1$, 265$n_2$. The contrast pixel 217 has a capacitor 212 that is electrically connected to one of the gate lines 262$n_1$, one of the source lines 265$n_1$, and a common electrode electrical line 255. The capacitor 212 is configured to generate the electrical field for controlling the portion of the liquid crystal layer 220 for the contrast pixel 217. In an embodiment, the gate lines 262$n_1$, 262$n_2$ and the source lines 265$n_1$, 265$n_2$ may be formed in one of the substrates 210 (shown in FIG. 3) of the back display panel 200 and the common electrode electrical line 255 may be formed in the other one of the substrates 210 of the back display panel 200. The terminal of the capacitor 212 that is electrically connected to the source line 265$n_1$ represents a pixel electrode of the contrast pixel 217 in an embodiment. The pixel electrode in an embodiment may extend along the X and Y direction.

Referring to FIG. 4B, a color pixel 117 includes three subpixels 116$_R$, 116$_G$, 116$_B$. Subpixel 116$_R$ is a subpixel that filters red light, subpixel 116$_G$ is a subpixel that filters green light, and subpixel 116$_B$ filters blue light. The subpixels 116$_R$, 116$_G$, 116$_B$ are each defined as a subpixel as a pixel in the displayed image is formed by the combination of the filtered light of the three subpixels 116$_R$, 116$_G$, 116$_B$. Each subpixel 116$_R$, 116$_G$, 116$_B$ has an area that is approximately defined by an adjacent pair of the gate lines 162$n_1$, 162$n_2$ and an adjacent pair of the source lines 165$n_1$, 165$n_2$, 165$n_3$, 165$n_4$. Each subpixel 116 has a capacitor 112 that is electrically connected to one of the gate lines 162$n_1$, a respective one of the source lines 165$n_1$, 165$n_2$, 165$n_3$, and a common electrode electrical line 155. The capacitor 112 is configured to generate the electrical field for controlling the portion of the liquid crystal layer 120 for the color pixel 117. In an embodiment, the gate lines 162$n_1$, 162$n_2$ and the source lines 165$n_1$, 165$n_2$, 165$n_3$, 165$n_4$ may be formed in one of the substrates 110 (shown in FIG. 3) of the front display panel 100 and the common electrode electrical line 155 may be formed in the other one of the substrates 110 of the front display panel 100. The terminal of each capacitor 112 that is electrically connected to one of the source lines 165$n_1$, 165$n_2$, 165$n_3$ represents a pixel electrode of one the subpixels 116$_R$, 116$_G$, 116$_B$ in an embodiment. Each of the pixel electrodes of the in an embodiment may extend along the X and Y direction.

As shown in FIGS. 4A and 4B, the area of the contrast pixel 217 is approximately equal to the size of the color pixel 117. As each subpixel 116$_R$, 116$_G$, 116$_B$ has its own capacitor 112 with a pixel electrode, each color pixel 117 has three pixel electrodes while the contrast pixel 217 has a single pixel electrode in an embodiment. The number of pixel electrodes per a unit area of the back display panel 200 is less than a number of pixel electrodes per unit area in the front display panel 100. For example, in an electronic display device 1 having color pixels 117 and contrast pixels 217 with the configuration shown in FIGS. 4A and 4B, a ratio of the number of pixel electrodes in the front display panel 100 to the number of pixel electrodes in the back display panel 200 would be 3:1 in an embodiment.

As discussed above, the number of subpixels 116 for each color pixel 117 is based on how many colors of filtered light the electronic display device 1 is designed to use to form each pixel in the displayed image. The ratio of 3:1 is based each contrast pixel 217 being configured to provide filtered light to one of the color pixels 117 and each color pixel 117 have a subpixel 116 for each color of light. As such, the ratio of the number of pixel electrodes in the front display panel 100 to the number of pixel electrodes in the back display panel 200 in an embodiment may expressed as a ratio of the number of colors used to form a pixel in a displayed image to 1 (number of colors used to form a pixel in the displayed image:1). For example, in an embodiment of an electronic display device 1 that is configured to filter two colors to form the pixel in a displayed image in an embodiment, a ratio of the number of pixel electrodes in the front display panel 100 to the number of pixel electrodes in the back display panel 200 would be 2:1. For example, in an embodiment of an electronic display device 1 that is configured to filter four colors to form the pixel in a displayed image in an embodiment, a ratio of the number of pixel electrodes in the front display panel 100 to the number of pixel electrodes in the back display panel 200 would be 4:1. For example, in an embodiment of the electronic display device 1 that is configured to filter five colors to form the pixel in a displayed image in an embodiment, a ratio of the number of pixel electrodes in the front display panel 100 to the number of pixel electrodes in the back display panel 200 would be 5:1

The subpixels 116$_R$, 116$_G$, 116$_B$ and the contrast pixel 217 in FIGS. 4A and 4B have a rectangular shape. However, it should be appreciated that the front display panel 100 and the back display panel 200 may be configured so that the subpixels 116$_R$, 116$_G$, 116$_B$ and the contrast pixels 217 have a different shape (e.g., non-rectangular, circular). In the embodiment shown in FIGS. 4A and 4B, the gate lines 162$n_1$, 162$n_2$, 262$n_1$, 262$n_2$ extend directly along the X direction and the source lines 165$n_1$, 165$n_2$, 165$n_3$, 165$n_4$, 265$n_1$, 265$n_2$ extend directly along a Y direction. However, the gate lines 162$n_1$, 162$n_2$, 262$n_1$, 262$n_2$ and/or source lines 165$n_1$, 165$n_2$, 165$n_3$, 165$n_4$, 265$n_1$, 265$n_2$ in an embodiment may not extend directly along the X and Y directions, respectively. For example, the source lines 165$n_1$, 165$n_2$, 165$n_3$, 165$n_4$, 265$n_1$, 265$n_2$ in an embodiment may extend along the Y direction while having portions that are slanted or curved in the X direction. In an embodiment, the gate lines may 162$n_1$, 162$n_2$, 262$n_1$, 262$n_2$ may extend along the Y direction and source lines 165$n_1$, 165$n_2$, 165$n_3$, 165$n_4$, 265$n_1$, 265$n_2$ may extend along the X direction.

Figure 5:
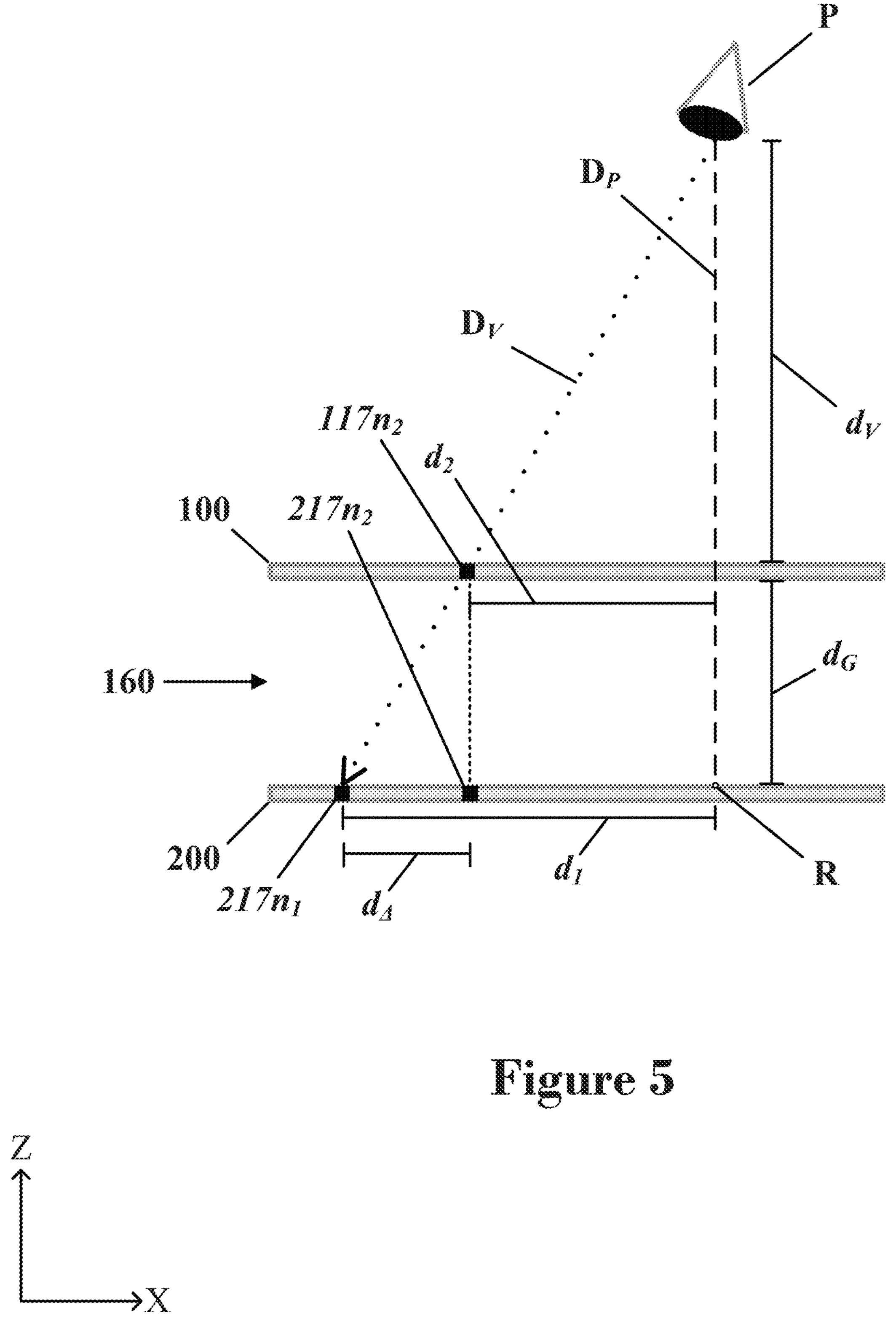
FIG. 5 is a schematic diagram showing a cross section of a front display panel and a back display panel in an embodiment of an electronic display device.

As discussed below with respect to FIG. 11A-11C, the back display panel 200 in an embodiment may have extra contrast pixels 217 as marginal contrast pixels (which would each have a pixel electrode). Accordingly, the ratios discussed above may be at or about 2:1, at or about 3:1, at or about 4:1, or at or about 5:1. FIG. 5 shows a schematic diagram of a cross section of the front display panel 100 and back display panel 200 of the electronic display device 1. The gap 160 separates the front display panel 100 and back display panel 200 by gap distance $d_G$. For example, the gap distance $d_G$ may be the distance between the color filter layer 115 of the front display panel 100 and the contrast layer 215 in the back display panel 200. Thus, the gap 160 in an embodiment may be formed due to the components of the front display panel 100 and the back display panel 200 and/or layers positioned between the front display panel 100 and the back display panel 200 that separate the color filter layer 115 and the contrast layer 215. In an embodiment, the direction $D_P$ is a direction perpendicular to a plane of the electronic display device 1 that intersects the viewing position P. In an embodiment, a reference point R is a point where the direction $D_P$ intersects with a plane of the back display panel 200. In an embodiment, the plane of the back display panel may be a plane of a front surface 202 of the back display panel 200. When the front display panel 100 and back display panel 200 are perpendicular, as shown in FIG. 2, the direction $D_P$ is a direction along the viewing direction. The color pixel 117$n_2$ is a distance $d_2$ in the X direction from a plane formed along the direction $D_P$. The contrast pixel 217$n_1$ is a distance $d_1$ in the X direction from the plane formed along the direction $D_P$. The distance $d_1$, distance $d_G$ and viewing distance $d_V$, and a length from the viewing position P to the contrast pixel 217$n_1$ along direction $D_V$ form a first triangle. The distance $d_2$, the distance $d_V$, and a length from the viewing position P to the color pixel 117$n_2$ form a second triangle that is inside the first triangle. The first triangle and the second triangle have the same angles. Accordingly, the distance $d_1$ and distance $d_2$ are related to the viewing distance $d_V$ and gap distance $d_G$ as shown in formula 1:

$$\frac{d_2}{d_V} = \frac{d_1}{d_V + d_G} \tag{1}$$

Further, the distance $d_1$ may be expressed as a function of the distance $d_2$, the viewing distance $d_V$, and gap distance $d_G$ as shown in formula 2:

$$d_1 = \frac{d_V + d_G}{d_V} \cdot d_2 \tag{2}$$

A distance $d_\Delta$ in the X direction between the contrast pixel 217$n_2$ configured to provide filtered light for the color pixel $117n_2$ and the contrast pixel $217n_1$ that does provide filtered light to the color pixel $117n_1$ when viewed from the position P may be referred to as shift.

As shown by the relationships above, the shift $d_\Delta$ in an embodiment is based on the viewing distance $d_V$ and the gap distance $d_G$. As discussed above, the gap distance $d_G$ in an embodiment may be formed due to the component layers of the display panels 100, 200 and any layers or sheets placed between the display panels 100, 200. Accordingly, the gap distance $d_G$ is based on the components/materials used to manufacture the electronic display device 1. Thus, the gap distance $d_G$ is constant for an electronic display device 1. Accordingly, the shift $d_\Delta$ is based on viewing distance $d_V$, which may change based on the position P of the person 5 viewing the electronic display device 1.

In an embodiment, image data describes the image to be displayed by the electronic display device 1. The electronic display device 1 includes an image processing unit 300 (shown in FIG. 6). The image processing unit 300 generates color image data for the front display panel 100 and contrast image data for the back display panel 200. The contrast image data describes how the contrast pixels 217 should be controlled and the color image data describes how the color pixels 117 should be controlled based on the image data. The contrast image data and color image data are generated so that pairs of color pixels 117 and contrast pixels 217 that overlap in the viewing direction filter light to form pixels of the desired image. The contrast image data may include contrast values for the contrast pixels 217 and the color image data may include color values for the color pixels 117 in an embodiment. A color value may describe how much light each subpixel 116 of a color pixel 117 should filter. A contrast value may describe how much light a contrast pixel 217 should filter.

However, as described above, the alignment of the color pixels 117 and the contrast pixels 217 may change depending upon the position P of the person 5. The generation of the contrast image data may include applying an expansion to account for the viewing position P in an embodiment. The amount of expansion E applied to the contrast image data is based on the viewing position P. This expansion modifies the resulting contrast image data so that each contrast pixel 217 provides the correct amount of light to the color pixel 117 to which the contrast pixel 217 is aligned with when viewed from the viewing position P. For example, color pixel $117n_2$ and contrast pixel $217n_2$ are aligned when the display panels 100, 200 are viewed in a normal viewing direction (e.g., in the Y direction) as shown by the short dashed line in FIG. 5. In contrast, the color pixel $117n_2$ and the contrast pixel $217n_1$ are aligned when the display panels 100, 200 are viewed by a person in the viewing position P. Including the expansion based on the viewing position P generate the contrast data so that the contrast pixel $217n_1$ correctly provides the amount of light for color pixel $117n_2$ and not the amount of light for color pixel $117n_1$ (shown in FIG. 3). It should be understood that the contrast pixel 217 that is aligned with a color pixel 117 when viewed from the viewing position P may not be directly adjacent to the contrast pixel 217 that overlaps with said color pixel 117 in the viewing direction. For example, the contrast pixel $217n_2$ that is aligned with a color pixel $117n_2$ in a viewing direction and the contrast pixel $217n_1$ that is aligned when viewed from the viewing position P may be separated by one or more contrast pixels 217 in an embodiment depending upon the viewing position P.

Applying expansion to image data is a known process. For example, image data for lower definition images may not include enough contrast values for an electronic display device with a higher pixel density. Previously, the image data for the lower definition image has been adapted to higher pixel densities by expanding the image data to include additional values. The expansion is performed so that the resulting image data has values for each pixel. There are many methods of performing expansion of image data. The expansion may be performed in many ways. For example, the expansion may modify the image data so that value for one pixel is applied to multiple pixels along the direction of the expansion. For example, an expansion may modify the image data so that values for two pixels in a first direction are applied to three pixels. For example, the values for the two pixels may be used to provide a value for a third value and/or the two values may be used to generate values for all three pixels. These are exemplary methods of expansion. It should be appreciated that the expansion as described herein is not limited to these examples and may include any type of expansion known in the art.

As shown in FIG. 1, the electronic display device 1 includes a camera 2 in an embodiment. The camera 2 can detect the position P of the person 5 relative to the electronic display device 1. In an embodiment, camera 2 detects a position of the person's eyes and uses this as the viewing position P. The camera 2 in an embodiment may detect positions for multiple people. The camera 2 is an example of a sensing device that can detect the position of a person 5. In an embodiment, the camera may be another type of sensing device. For example, the sensing device in an embodiment may be a device that can determine the position of a person 5 based on detecting a remote, a controller, or other device held by the person 5. The sensing device then providing the viewing position 5 to the image processing unit 300 (described below with respect to FIG. 6). Alternatively, the viewing position 5 in an embodiment may be manually provided by the person 5 on an input device (not shown), such as on a touch screen.

Figure 6:
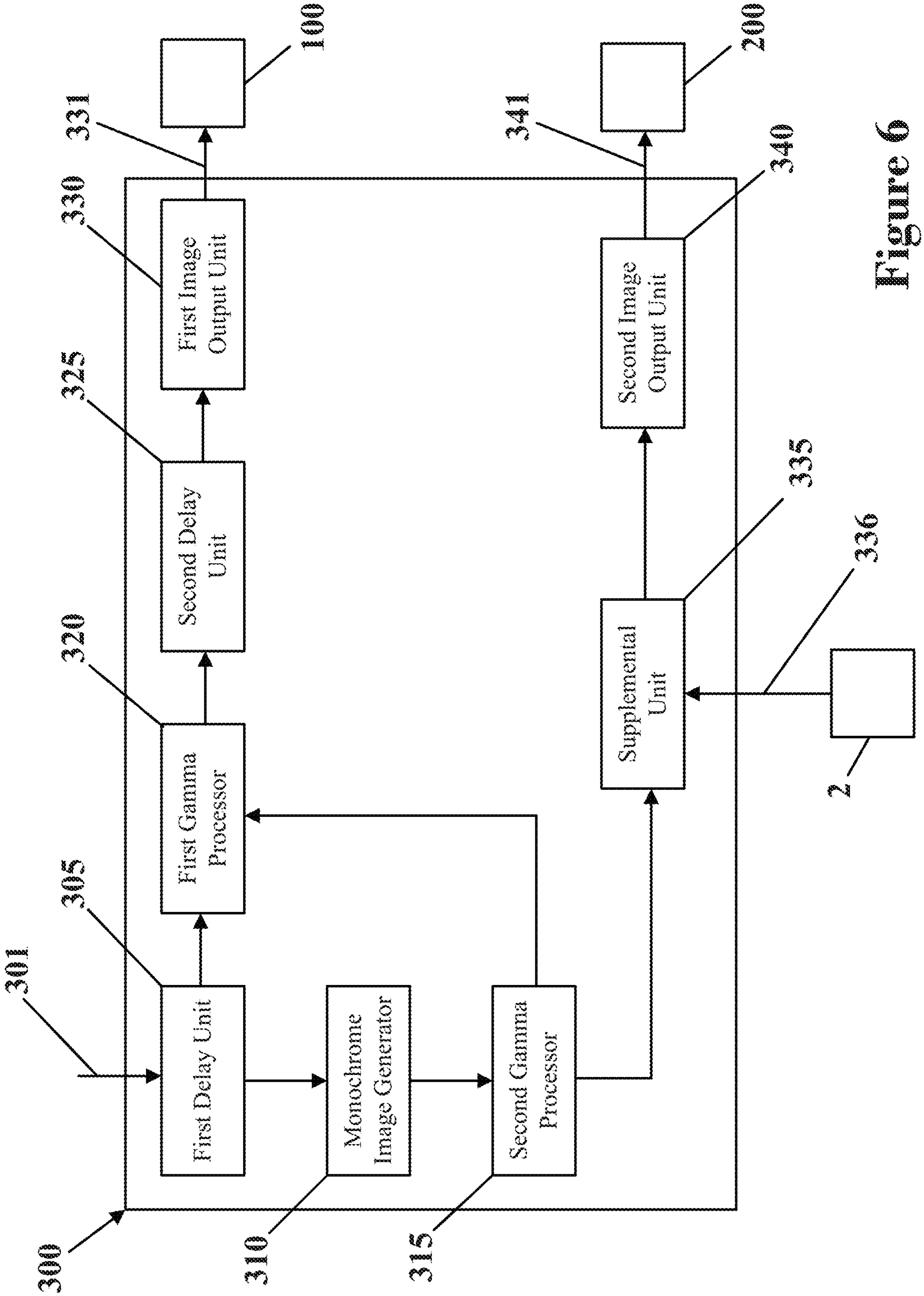
FIG. 6 is a schematic diagram of the components of an image processing unit for an electronic display device in an embodiment.

FIG. 6 is a schematic diagram of the components of an image processing unit 300 in an embodiment. The electronic display device 1 includes the image processing unit 300 in an embodiment. The image processing unit 300 includes a first delay unit 305, a monochrome image generator 310, a second gamma processor 315, a first gamma processor 320, a second delay unit 325, a first image output unit 330, a supplemental unit 335, and a second image output unit 340. The image processing unit 300 receives external input image data 301 corresponding to the image to be displayed and generates the color image data 331 and the contrast image data 341. The first delay unit 305 receives the external input image data 301 and provides it to both the first gamma processor 320 and the monochrome image generator 310. The monochrome image generator 310 generates monochrome image data that includes contrast. The monochrome image data is then provided to the second gamma processor 315 that utilizes the monochrome image to generate modified monochrome image data. The modified monochrome image data is then provided to both the first gamma processor 320 and the supplemental unit 335. The first gamma processor 320 receives the external input image data 301 from the first delay unit 305 and the modified monochrome image data from the second gamma processor 315. The first gamma processor 320 processes the external input image data 301 and the modified monochrome image data to produce the color image data. The color image data includes color values for each subpixel 116 of each color pixel 117. The first gamma processor 320 utilizes the modified monochrome image data to, for example, prevent over or under saturation in the displayed image. The color image data is then provided to the second delay unit 325, which then provides it to the first image output unit 330. The first image output unit 330 then provides a signal 331 corresponding to the color image data to the front display panel 100. For example, the signal 331 may be provided to a source driver (not shown) and a gate driver (not shown) of the front display panel 100 in an embodiment.

The supplemental unit 335 receives the modified monochrome image data from the second gamma processor 315 and position data 336 corresponding to the viewing position P from the camera 2 in an embodiment. As discussed previously, a different automatic sensing device other than the camera 2 or a manual input device may provide the viewing position P in an embodiment. In such an embodiment, the different automatic sensing device or the manual input device provides the position data 336 to the supplemental unit 335. The supplemental unit 335 generates the contrast image data based on the modified monochrome image data and the position data 336. The supplemental unit 335 may generate the contrast image data by applying the expansion to the modified monochrome image data. The contrast image data is then provided to the second image output unit 340, which then sends a signal 341 corresponding to the contrast image data to the back display panel 200. The signal 341 of the contrast image data may be provided to a source driver (not shown) and a gate driver (not shown) of the back display panel 200 in an embodiment. In an embodiment, the first delay unit 305 and second delay unit 325 may cause delays so that the color image data 331 is sent to the front display panel 100 and contrast data 341 is sent to the back display panel 200 at approximately the same time.

The described image processing unit 300 is for a front display panel 100 that has the color pixels 117 and a back display panel 200 that has the contrast pixels 217. However, the front display panel 100 and back display panel 200 may be reversed in an embodiment. In such an embodiment, the image processing unit 300 may be configured so that the signal 341 corresponding to the color image data (which would be provided to a back display panel with color pixels 117) is generated based on the external input image data 301 and the positional data 336. The signal 341 corresponding to the contrast image data (which would be provided to a front display panel having contrast pixels 217) would be generated without the expansion based on the positional data 336. In such an embodiment, two of the first delay unit 305, first gamma processor unit 320, the second delay unit 325, and the first image output unit 330 may be electrically connected via the supplemental unit 335, while the second gamma processor 315 and second image output unit 340 may electrically connected without the supplemental unit 335.

The described components of the image processing unit 300 are exemplary. In an embodiment, each of the described components of the image processing unit 300 is a separate electrical unit and the described pathways connecting the components are electrical connections. In an embodiment, one or more of the described components may be combined. For example, two or more of the monochrome image generator 310, second gamma processor 315, and supplemental unit 335 may be combined in an embodiment. In an embodiment, the described components may be interconnected in a different manner than described and shown in FIG. 6. For example, supplemental unit 335 may be positioned so as to electrically connect the first delay unit 305 and the monochrome image generator 310 or electrically connect the monochrome image generator 310 and the second gamma processor 315. In an embodiment, the image processing unit 300 may include additional components.

In an embodiment, the supplemental unit 335 may be positioned between the first delay unit 305 and the monochrome image generator 310. In such an embodiment, the supplemental unit 335 generates expanded external input image data by applying an expansion to the external input image data 301 based on position data 336 and provides the expanded external input image data to the monochrome image generator 310. The monochrome image generator 310 generates expanded monochrome image data based on the expanded external input image data and provides the expanded monochrome image data to the second gamma processor 315. The second gamma processor 315 generates the contrast image data based on the expanded monochrome image data and provides the contrast image data to the first image gamma processor 320 and the second image output unit 340.

In an embodiment, the supplemental unit 335 may be positioned between the monochrome image generator unit 305 and the second gamma processor 315. In such an embodiment, the supplemental unit 335 may receive the monochrome image data from the monochrome image generator 310 and the position data 336, generate the expanded monochrome image data based on monochrome image data and the position data 336, and provide the expanded monochrome image data to the second gamma processor 315. The second gamma processor 315 may generate contrast image data based on the expanded monochrome image data, and provide the contrast image data to the first gamma processor 320 and the second image output unit 340.

In an embodiment, the supplemental unit 335 and the monochrome image generator 310 may be provided as a single unit that receives the external input image data 301 from the first delay unit 305 and the position data 336, and generates and provides the expanded monochrome image data to the second gamma processor 315.

In an embodiment, the monochrome image generator 310, second gamma processor 315, and supplemental unit 335 may be combined into a single contrast image generator unit. In such an embodiment, the contrast image generator unit may receive the external input image data 301 from the first delay unit 305 and the position data 336 from the sensing device 2. The contrast image generator unit may generate the contrast image data based on external input image data 301 and the position data 336, without other generators/processors/units (e.g., monochrome image generator 310, second gamma processor 315, supplemental unit 335).

The generation of the contrast image data may include applying an expansion to the external input image data 301. Applying an expansion to the external input image data may include applying the expansion directly or indirectly to the external input image data 301 in an embodiment. An expansion may be applied indirectly to the external input image data 301 by applying the expansion to image data based on the external input image data 301. For example, the image data based on the external input image data 301 may be the monochrome image data or modified monochrome image data in an embodiment. It should be understood that the image data based on the external input image data 301 in an embodiment may be image data that is generated from or based on the external input image data 301 and is used for generating the contrast image data when the back display panel 200 has the contrast pixels 217.

Referring back to FIG. 5, the contrast image data is generated by expanding the external input image data 301 (or image data based on the external input image data 301)

so that contrast pixel $217n_1$ has a contrast value that results in the contrast pixel $217n_1$ providing the correct amount of light for color pixel $117n_2$. An amount of expansion E may be determined using, for example, formula (2) described above. The amount of expansion is typically applied as a ratio of increase or a percentage increase. In an embodiment, the amount of expansion E may be a ratio calculated by dividing $d_1$ by $d_2$, which describes the amount that an image is increased in the X direction as a ratio. The amount of expansion E may be calculated based on formula (2) as described above and may be expressed as follows:

$$E = \frac{d_1}{d_2} = \frac{d_V + d_G}{d_V}$$

When the external input image data 301 (or image data based on the external input image data 301) is expanded by E, the generated contrast data includes a contrast value for contrast pixel $217n_1$ that is based on the contrast value for pixel $217n_2$ that was configured to provide light to pixel $117n_2$. Thus, when viewed from the viewing position P, the contrast pixel $217n_1$ provides the correct amount of light to the color pixel $117n_2$.

In an embodiment, a gap distance $d_G$ is 10 mm and a viewing distance $d_V$ is 100 mm. In such an embodiment, external input image data 301 (or image data based on the external input image data 301) is expanded by 1.1. The person 5 may move to a different viewing position P with a viewing distance $d_V$ of 150 mm. In this viewing position P, external input image data 301 (or image data based on the external input image data 301) is expanded by 1.07. In an embodiment, the expansion may describe how many additional values the expansion produces. For example, applying an expansion of 1.2 to image data along a single direction would result in expanded image data having 20% more values than the original image data. As the expansion generates additional contrast values while the number of contrast pixels 217 does not change, some of the values (e.g., contrast values) are not used in an embodiment. In an embodiment, the generated contrast data does not include values (e.g., contrast values) that are not utilized.

Expansion is applied from a point or area along at least one direction in an embodiment. In an embodiment, the point from which an expansion is applied may be referred to as a center point. The image data is expanded in that direction. In an embodiment, the expansion may be applied based on the reference point R, which is shown in FIGS. 2 and 5. FIGS. 7A, 7B, and 7C illustrate how an image 400 is utilized by color pixels 117 in a front display area 410 of the front display panel 100 and by contrast pixels 217 in a back display area 420 of the back display panel 200 in an embodiment. FIG. 7A shows an example of the image 400 that is displayed by the electronic display device 1. FIG. 7B shows the front display area 410 that is an area of a display surface of the front display panel 100 that includes all of the color pixels 117 formed in the front display panel 100 in an embodiment. FIG. 7C shows the back display area 420 that is an area of a display surface of the back display panel 200 (e.g., the surface that faces the front display panel 100) that includes all of the contrast pixels 217 formed in the back display panel 200 in an embodiment.

For illustration, the image 400 is a vertically striped image in which the stripes form columns 402. The columns 412 for the front display area 410 illustrate how the image 400 is utilized in generating the color values applied to the color pixels 117 in the front display panel 100. All of the color values in one column 412 are based on the portion of the image 400 in one of the columns 402 in an embodiment. For example, the color values of column 412A are all generated based on the portion of the image 400 in column 402A. As the exemplary image 400 is a striped image, the color values of column 412A are all generated based on the stripe in column 402A of the image 400. As the color image data is not expanded in this embodiment, the columns 412 are similar to the columns 402. The columns 422 of the back display area 420 illustrate groups of the contrast values as applied to contrast pixels 217 in the back display panel 200. All of the contrast values in one column 422 are based on the portion of the image 400 in one of columns 402. For example, the contrasts values of column 422A are generated based on the portion of the image 400 in column 402A. As the exemplary image 400 is a striped image, the contrast values of column 422A are generated based on the stripe in column 402A of the image 400

The differences between the columns 412 of the front display area 410 and the columns 422 of the back display area 420 demonstrate how the expansion affects the contrast image data. The contrast image data is generated by being expanded in both the positive X direction and negative X direction from the reference point R. Thus, the columns 422 in the back display area 420 have a greater width in the X direction relative to the columns 412 in the front display area 410. The columns 422 also have different positions (e.g., being shifted along the X direction) relative to the columns 412 in the front display area 410 as a result of the expansion based on the viewing position P. As shown by FIGS. 7B and 7C, the back display area 420 also has fewer columns 422 than the front display area 410. As the generation of the contrast image data includes an expansion based on the viewing position P, some of the image is not utilized by the contrast pixels 217 in the back display panel 200. For example, the portion of the image 400 in column 402B is utilized was used to generate the color values for column 412B, but none of the contrast values for the contrast pixels 217 in the back display area 420 were generated based on the portion of image 400 in column 402B.

Figure 8A:
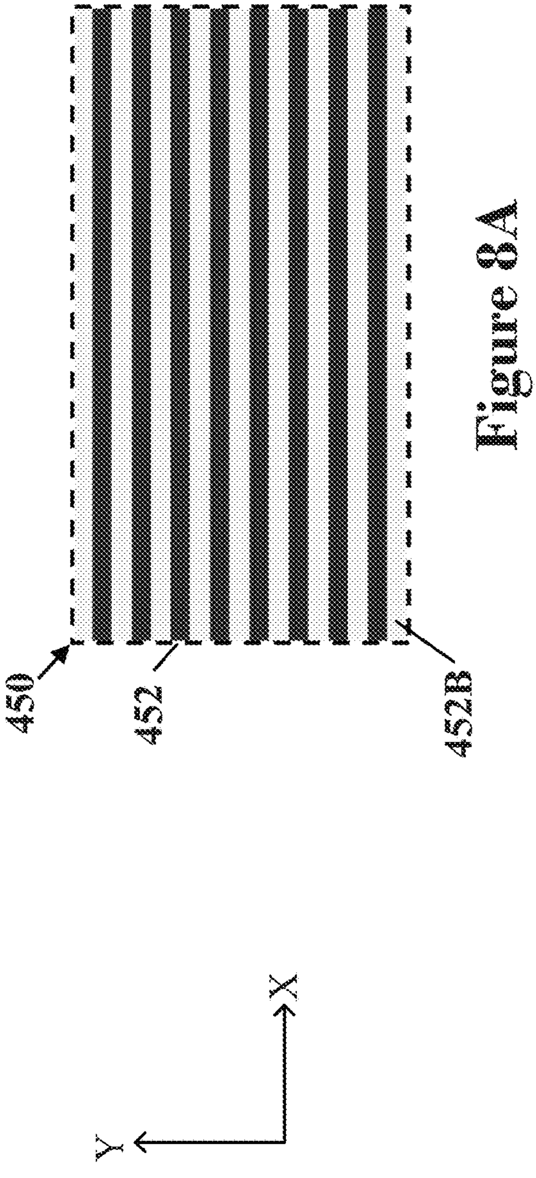
FIGS. 8A-8C illustrate how an image is utilized by color pixels in a front display panel and by contrast pixels in a back display panel in an embodiment.
Figure 8B:
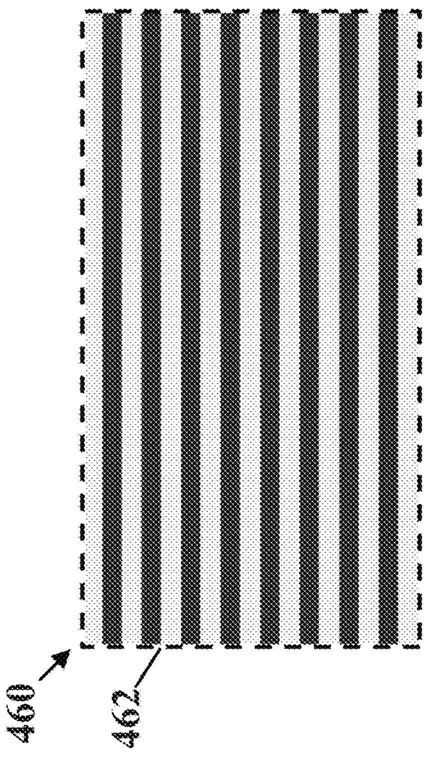
Figure 8C:
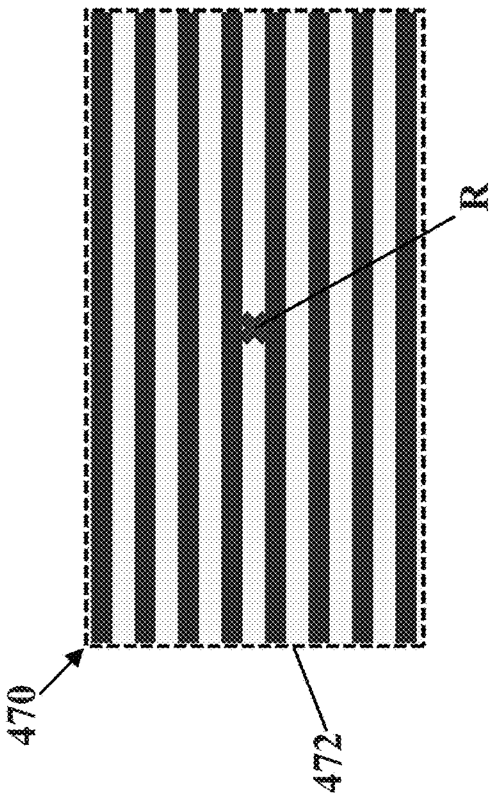

Expansion can also be applied along the Y axis. FIGS. 8A, 8B, and 8C illustrate how an image 450 is utilized by color pixels 117 in a front display area 460 of the front display panel 100 and by contrast pixels 217 in a back display area 470 of the back display panel 200 in an embodiment. FIG. 8A shows an example of an image 450 that is to be displayed by the electronic display device 1. FIG. 8B shows how color pixels 117 in the front display area 460 utilize the image 450, which may be referred to as a color image in an embodiment. FIG. 8C shows how contrast pixels 217 in the back display area 470 utilize the image 450, which may be referred to as a contrast image in an embodiment.

For illustration, the image 450 is a horizontally striped image with the horizontal stripes forming rows 452. The rows 462 of the front display area 460 illustrate how the image 450 is utilized in generating the color values for the color pixels 117 in the front display panel 100. Similar to the columns 412 in FIG. 7B, except as applied to rows 462, all of the color values in each row 462 are based on the portion of the image 450 in one of the rows 452. As exemplary image 450 is a striped image, the color values for each row 462 are all generated based on a stripe in one respective row 452 of the image 450. The rows 462 in the front display area 460 are similarly shaped and positioned as the rows 452 in the image 450 as the color data is not expanded based on a viewing position P in an embodiment. Rows 472 of the back display area 470 illustrate groupings of the contrast values as utilized by the contrast pixels 217 in the back display panel 200. Similar to the columns 422 in FIG. 7C except as applied to rows, all of the contrasts in each row 472 are based on the portion of the image 450 in one of rows 452. As exemplary image 450 is a striped image, the contrast values for each row 472 are all generated based on a stripe in one respective row 452 of the image 450.

The differences between the rows 462 of the front display area 460 and the rows 472 of the back display area 470 demonstrate how the expansion based on the viewing positon affects the resulting contrast image data. The rows 472 in the back display area 470 are wider in the Y direction and in different positions in the Y direction relative to the rows 462 in the front display area 460 as the generation of the contrast image data includes an expansion in both the positive Y direction and negative Y direction from the reference point R. As shown by comparing the image 450 in FIG. 8A and contrast image for the back display area 470 as shown by FIG. 8C, the expansion results in contrast data not including any contrast value based on the portion of the image in row 452B of the image 450. The expansion may be applied in both the X and Y directions in an embodiment.

The reference point R is determined by the viewing position P. In some embodiments, the reference point R may not be located at or about a center of the back display area 420, 470. In an embodiment, the person 5 may have a viewing position P that results in reference point R being shifted in the vertical direction (e.g., positive Y or negative Y direction) and/or horizontal direction (e.g., positive X or negative X direction) relative to the center of the back display area 420, 470 of the back display panel 200.

The person 5 may have a viewing position P in an embodiment that results in the reference point $R_1$ not being along the back display area 500 of the back display panel 200 as shown in FIG. 9. In such an embodiment, the expansion may be applied as if the reference point is along the closest edge to the reference point $R_1$. For example, expansion in the Y direction for the reference point $R_1$ may be applied from the lower edge 502 of the back display area 500 in the positive Y direction as shown by the solid arrows. For example, expansion in the X direction for the reference point $R_1$ in an embodiment may be applied in the X direction and from a plane 504 extending in the Y direction from the reference point $R_1$, as illustrated by the dashed arrows.

Figure 10A:
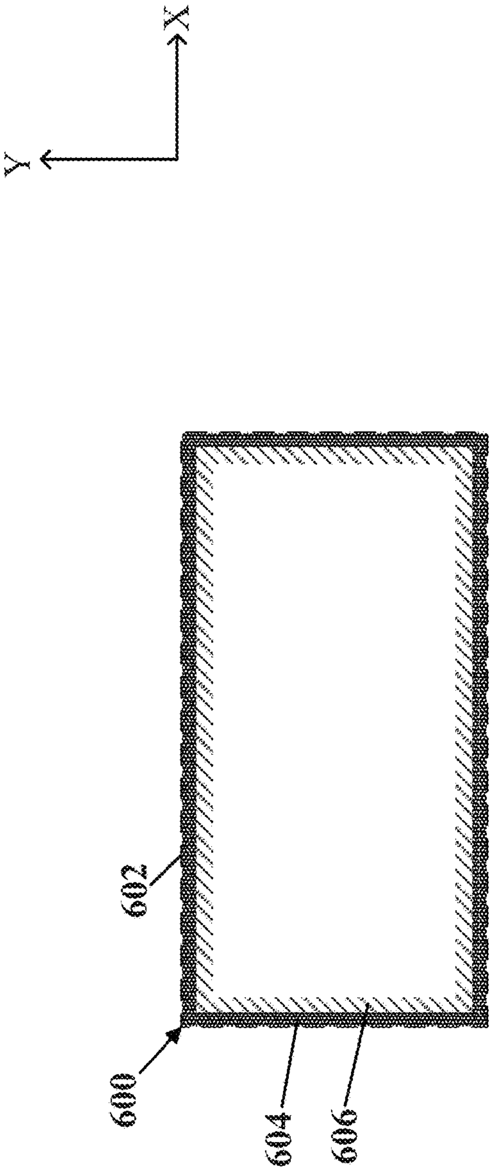
FIGS. 10A-10C illustrate how an image is utilized by color pixels in a front display panel and by contrast pixels in a back display panel in an embodiment.
Figure 10C:
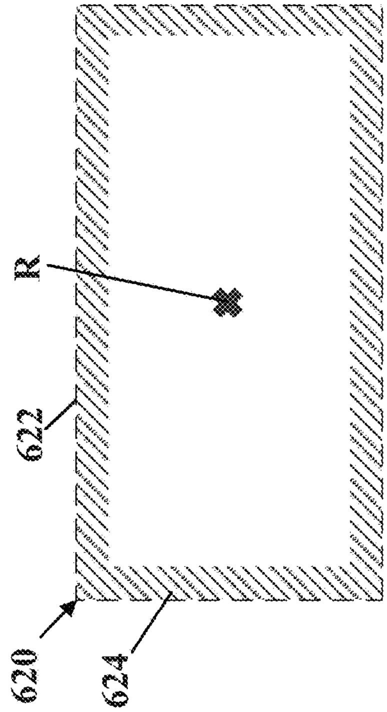
Figure 10B:
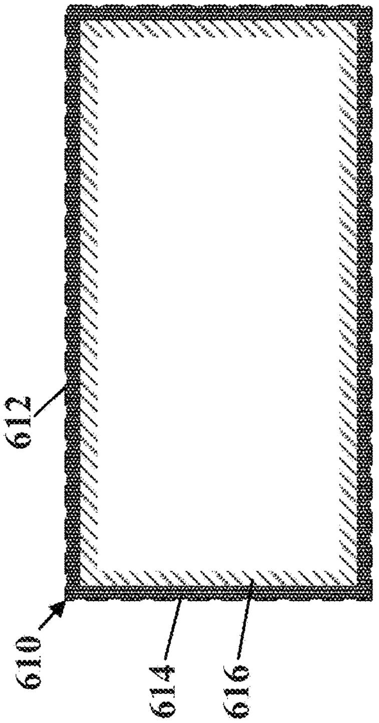

FIGS. 10A, 10B, and 10C illustrate how an image 600 is utilized and displayed by color pixels 117 in a front display area 610 of the front display panel 100 and contrast pixels 217 in a back display area 620 of the back display panel 200 in an embodiment. FIG. 10A shows the image 600 to be displayed by the electronic display device 1. The image 600 has an outer edge portion 604 along its edge 602 and an inner portion edge portion 606 along and adjacent to the outer edge portion 604. FIG. 10B shows the front display area 610 that includes a first plurality 614 of the color pixels 117 that are located along and adjacent to the edge 612 of the display area 610 and a second plurality 616 of the color pixels 117 that are located along an inner edge and/or adjacent to the first plurality 614 of the color pixels 117. The first plurality 614 of the color pixels 117 are located between the edge 612 of the display area 610 and the second plurality 616 of the color pixels 117. FIG. 10C shows the back display area 620 that a first plurality 624 of the contrast pixels 217 in the back display panel 200 that are located along and adjacent to an edge 622 of the back display area 620. In an embodiment, the front display panel 100 and the back display panel 200 have the same number of pixels and size (e.g., area) of the front display area 610 of the front display panel 100 and the back display area 620 of the back display panel are substantially the same. The color values for the color pixels 117 of the first plurality 614 are generated based on the outer edge portion 604 of the image 600. The color values for the color pixels 117 of the second plurality 616 are generated based on the inner edge portion 606 of the image 600. In an embodiment, the generation of the contrast image data for the contrast pixels 217 in the back display area 620 includes expanding image data in both the X direction and the Y direction based on a viewing position P (e.g., viewing position P in FIG. 2) from a reference point R. The contrast image data includes contrast values for controlling the contrast pixels 217 in the back display panel 200. The contrast values for the first plurality 624 of the contract pixels 217 in an embodiment are generated based on the inner edge portion 604 of the image 600. The contrast image data does not include any contrast values that are generated based on the outer edge portion 604 of the image 600. The contrast values based on the outer edge portion 604 are not utilized, generated, or are removed to compensate for the additional values are added by the expansion.

Figure 11A:
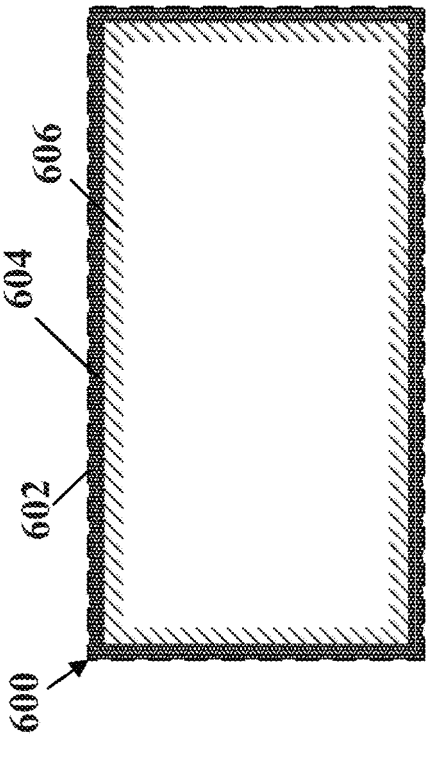
FIGS. 11A-11C illustrate how an image is utilized by color pixels in a front display panel and by contrast pixels in a back display panel in an embodiment.
Figure 11B:
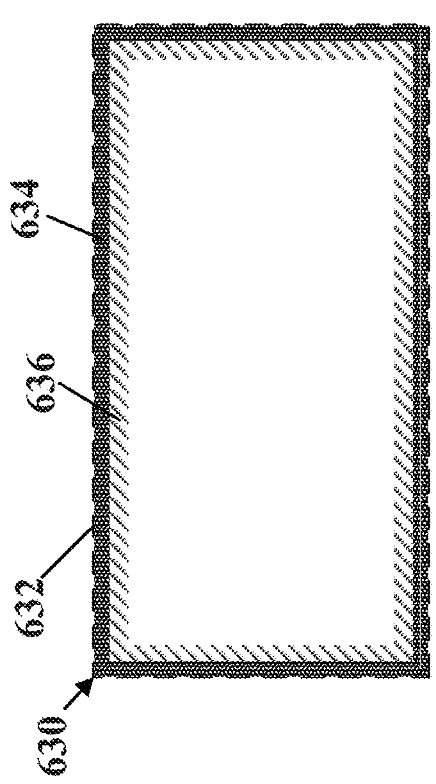
Figure 11C:
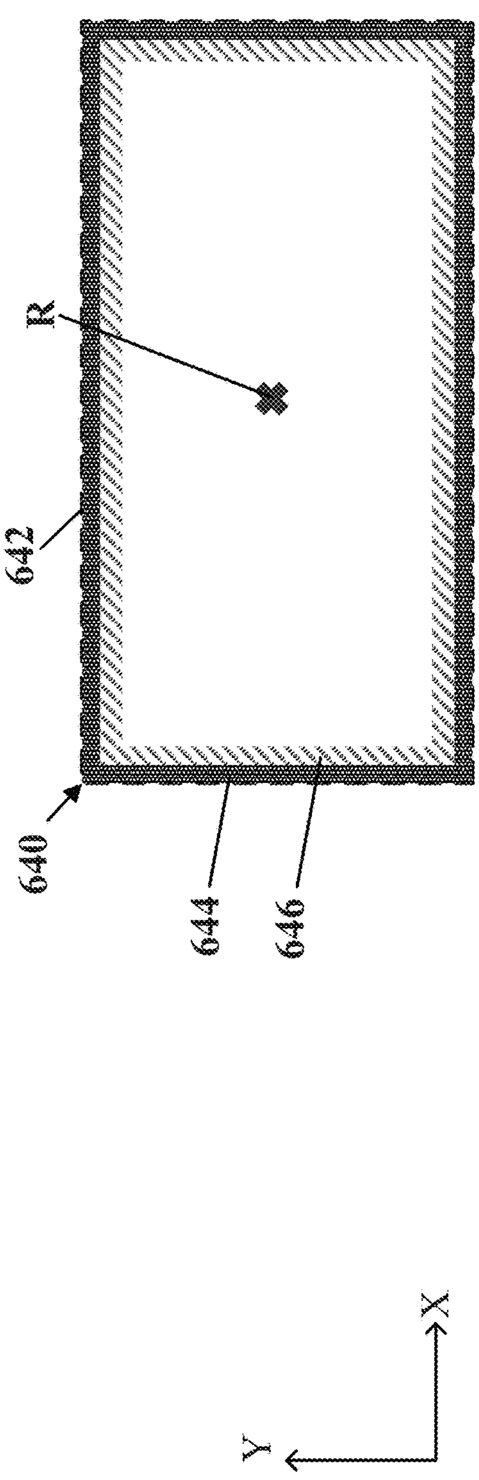

FIGS. 11A, 11B, 11C illustrate how an image 600 is utilized and displayed in a front display area 610 of the front display panel 100 and a back display area 640 of the back display panel 200 in an embodiment. FIG. 11A shows the image 600 to be displayed by the electronic display device 1 includes an outer edge portion 604 and inner portion edge portion 606 as similarly described above for FIG. 10A. FIG. 11B shows a first plurality 634 of color pixels 117 and a second plurality 636 of color pixels 117 of the front display area 610, which are similar to the first plurality 614 and second plurality 616 of color pixels 117 of the front display area 610, respectively, as shown in FIG. 10B and described above. FIG. 11C shows the back display area 640. The back display area has more contrast pixels 217 than the front display area 610 has color pixels 117 in an embodiment. For example, the front display panel 200 in an embodiment may include extra contrast pixels 217 that are arranged as marginal pixels along one or more edges of the back display panel 200 for when the electronic display device 1 is viewed at acute angles relative to the viewing surface 3 of the electronic display device 1. In such an embodiment, each of color pixels 117 along an edge 632 of the front display surface 630 (e.g., a group of the first plurality 634) may have two or more contrast pixels 217 in the back display panel 200 that are configured to provide filtered light. For example, one of the two or more contrast pixels 217 is configured to provide filtered light for a color pixel 117 along the edge 634 when the electronic display device 1 is viewed in the viewing direction, and one of the two or more contrast pixels 217 is configured to provide filtered light for said color pixel 117 when the electronic display device 1 is viewed at an angle that is acute relative to the viewing surface 3. Thus, the size (e.g., area) of the front display area 610 of the front display panel 100 in an embodiment is smaller than the back display area 640 of the back display panel 200 as the back display panel 200 has a larger display area to accommodate the larger number of pixels 217 (relative to the number of color pixels 117 in the front display panel 100).

The back display area 640 includes a first plurality 644 of the contrast pixels 217 that are located along and adjacent to an edge 642 of the back display area 640 and a second plurality 646 of the contrast pixels 217 that are located along and/or adjacent to the first plurality 644 of the contrast pixels 217. The generation of the contrast image data for the contrast pixels 217 includes an expansion of image data based on a viewing position P in both the X and Y directions. The contrast pixels 217 in the back display area 640 are controlled according to the contrast data. The contrast values for the first plurality 644 of the contract pixels 217 are generated based on the outer edge portion 604 of the image 600. The contrast values for the second plurality 646 of the contrast pixels 217 are generated based on the inner edge portion 606 of the image 600 and then expanded from the reference point R based on the viewing position P (e.g., the viewing position in FIG. 2) in an embodiment. The first plurality 644 of the contrast pixels 217 may provide filtered light for the first plurality 634 of colored pixels 117 and the second plurality 646 of the contrast pixels 217 may provide light for the second plurality 636 of color pixels 117 in an embodiment. Thus, light filtered by the first plurality 644 of contrast pixels 217 and the first plurality 634 of the colored pixels 117 may form pixels to display the outer edge portion 604 of the image 600 and light filtered by the second plurality 646 of the contrast pixels 217 and the second plurality 636 of the color pixels 117 may form pixels to display the inner edge portion 606 of the image 600.

In an embodiment, more than one person may be viewing the display device. In an embodiment, two people 6, 7 are viewing the electronic display device 1 as shown in FIG. 12. Each person 6, 7 has a viewing position $P_1$, $P_2$ and with a corresponding viewing distance $d_{V1}$, $d_{V2}$. In an embodiment, one of the two viewing positions $P_1$, $P_2$ may be selected as the viewing position for applying expansion to the contrast image data. In an embodiment, the contrast image data may be generated using both viewing positions $P_1$, $P_2$. A reference point $R_{P1}$, $R_{P2}$ may be determined using the respective directions $D_{P1}$ and $D_{P2}$ for each viewing position $P_1$, $P_2$ in a similar manner described previously for the reference point R.

Figures 13A, 13B, 13C:
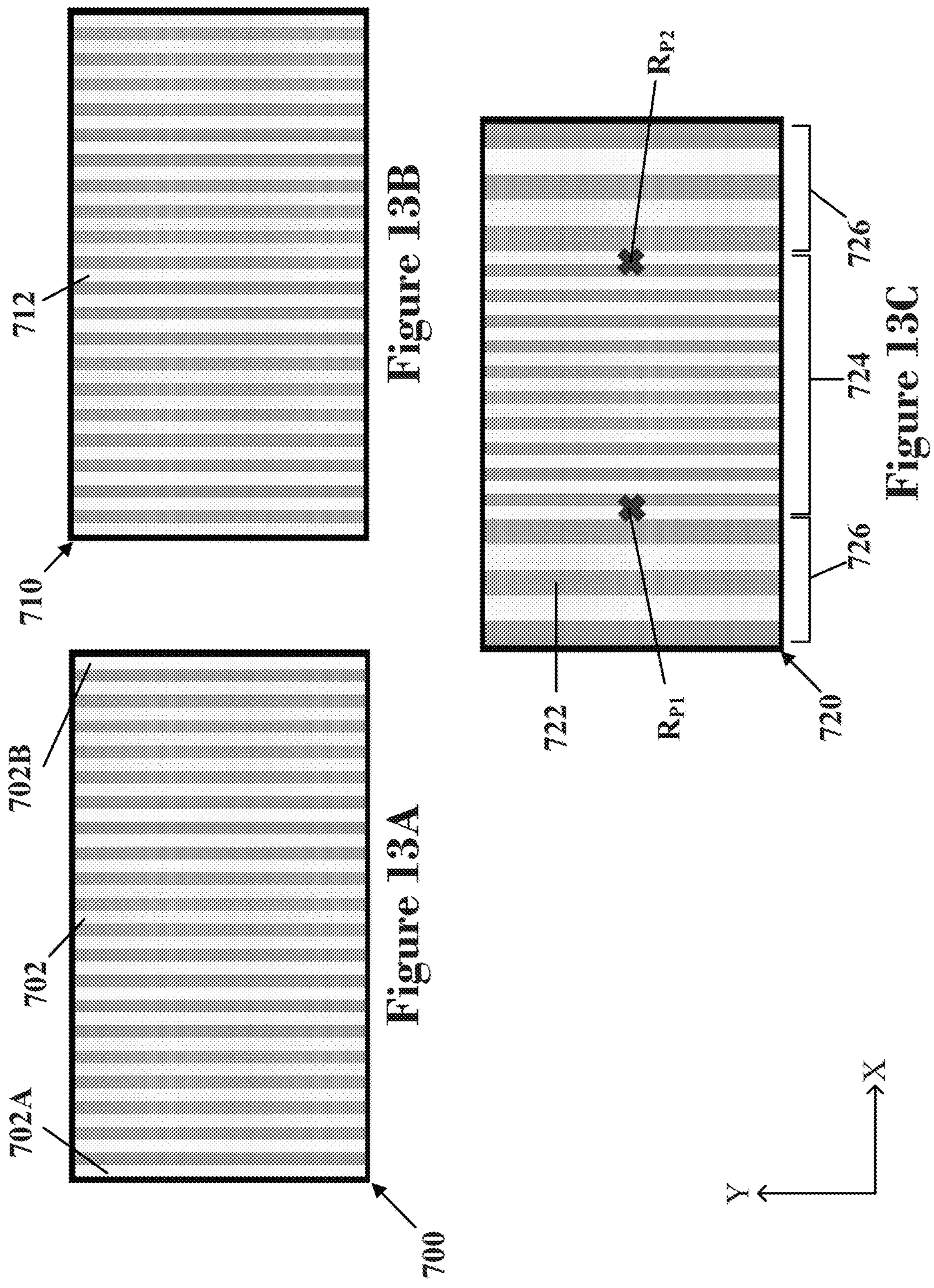
FIGS. 13A-13C illustrate how an image is utilized by color pixels in a front display panel and by contrast pixels in a back display panel in an embodiment.

FIGS. 13A, 13B, and 13C illustrate how an image 700 is utilized and displayed in a front display area 710 and in a back display area 720 in an embodiment when multiple viewing positions (e.g., viewing position $P_1$ and viewing position $P_2$) are utilized. FIG. 13A shows the image 700 to be displayed by the electronic display device 1, which is similar to the image 450 of FIG. 7A. FIG. 13B shows the front display area 710 of the front display panel 100, which has a similar configuration to front display area 410 of FIG. 7B. For illustration, the image 700 is a vertically striped image with the vertical stripes that form columns 702. The columns 712 of the front display area 710 illustrate image 700 is utilized by the color pixels 117 in the front display panel 100. The columns 712 have a similar configuration to the columns 702 of the image 700 as the generation of the contrast data for the color pixels 117 does not include an expansion based on a viewing position P.

FIG. 13C shows how the image 700 of FIG. 13A is utilized by the contrast pixels 217 in the back display panel 200. Each of the columns 722 correspond, respectively, to the one of the columns 702 in the image. All of the contrast values in one column 722 are based on the portion of the image 700 in a corresponding one of the columns 702. The differences in the width (along the X direction) and positioning of the columns 712 of the front display area 710 when compared to the columns 722 of the back display area 720 demonstrate how the expansion affects the contrast image data. The contrast image data has been expanded twice in an embodiment shown in FIGS. 13A-13C. The contrast data was generated in an embodiment by applying a first expansion along the X direction from reference point $R_{P1}$ and then applying a second expansion along the X direction from the reference point $R_{P2}$. Alternatively, the contrast data may be generated in an embodiment by combining the effects of both expansions and then applying the combined effect to the image data (e.g., external input image data 301, image data based on the external input image data 301) for controlling the contrast pixels 217 in the back display panel 200.

The amount of expansion $E_1$, $E_2$ that is applied for each viewing position $P_1$, $P_2$ may be calculated based on the gap distance $d_G$ and the respective viewing distance $d_{V1}$, $d_{V2}$ of each viewing position $P_1$, $P_2$ as similarly discussed above. As shown in FIG. 12, the viewing distance $d_{V1}$ for the first viewing position $P_1$ is the same as the viewing distance $d_{V2}$ for the second viewing position $P_2$. Thus, the amount of expansion $E_1$ applied for the first viewing position $P_1$ and the amount of expansion $E_2$ applied for the second viewing position $P_2$ are the same. As shown by FIG. 13C, the contrast image data is not equally expanded along the X direction due to the interaction of the expansions. The expansions cancel each other out in a middle portion 724 between the reference points $R_{P1}$, $R_{P2}$ as the expansions apply an equal amount $E_1$, $E_2$ of expansion in opposite directions along the X axis along this middle portion 724. In contrast, the expansions are additive and produce a larger effect in the end portions 726 of the back display area 720 that are not between the reference points $R_{P1}$, $R_{P2}$. In a similar manner as discussed with respect to FIGS. 7A and 7C, the expansion results in the contrast image data not including any contrast values based on some portions of the image 700. In particular, the contrast image data does not include any contrast values that are based on the portions of the image 700 in the outermost columns 702A, 702B.

In an embodiment, the viewing positions $P_1$, $P_2$ may have different viewing distances $d_{V1}$, $d_{V2}$. In an embodiment, the expansion may be applied in more than one direction. The expansion may be applied along both the X direction and the Y direction in an embodiment. In an embodiment, one or both of the reference points $R_{P1}$, $R_{P2}$ may in a different position in the X and/or Y direction.

Figure 14:
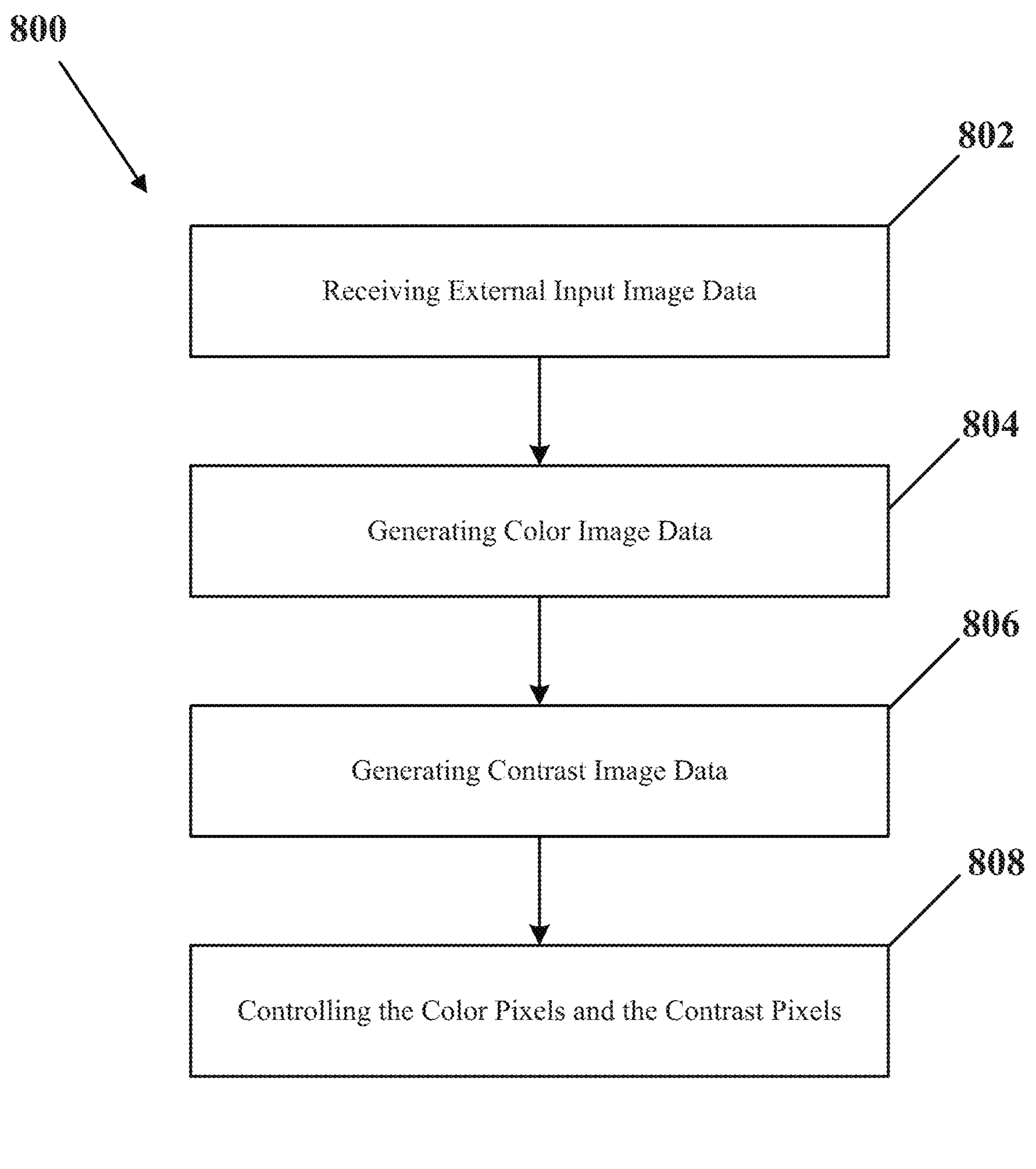
FIG. 14 shows an embodiment of a method for displaying an image using an electronic display device.

FIG. 14 shows an embodiment of a method 800 for displaying an image using an electronic display device 1. The method includes receiving external input image data 802, generating color image data 804, generating contrast image data 806, and controlling the color pixels and the contrast pixels 808. Receiving external input image data 802 may include receiving external input image data (e.g., external input image data 301 of FIG. 6) that corresponds to an image to be displayed by the electronic display device 1. The external input image data may be sent from a device external to the electronic display device 1 in an embodiment. Generating color image data 804 may include generating the color image data for controlling each of the color pixels 117 in the front display panel 100 based on the external input image data. The color image data includes a color value for each of the color pixels 117. A color value in an embodiment may describe the amount of light each subpixel 116 of a color pixel 117 filters to produce a desired color for said color pixel 117. Generating contrast image data 806 may include utilizing external input image data and positional data (e.g., positional data 336 of FIG. 6) to generate contrast image data that includes contrast values for controlling each contrast pixel 217 in the back display panel 200. In an embodiment, the contrast image data may be generated based on the external input image data and the positional data. The positional data corresponds and/or indicates at least a viewing position of a person viewing the electronic display device 1 (e.g., viewing position P of FIG. 2, viewing position $P_1$ of FIG. 12, viewing position $P_2$ of FIG. 12) in an embodiment. In an embodiment, the contrast image data may be generated by applying an expansion to the external input image data or image data based on the external input image data. In an embodiment, the contrast image data may be generated by applying an expansion in both a first direction and a second direction. In an embodiment, the image contrast data is generated based on two viewing positions $P_1$, $P_2$. Controlling the color pixels and the contrast pixels 808 in an embodiment may include controlling color pixels 117 in a front display panel 100, and controlling contrast pixels 217 in a back display panel 200. In the described method 800, the contrast pixels 217 are in the back display panel 200 and the color pixels 117 are in the front display panel 100. However, it should be understood that the front display panel 100 and back display panel 200 may be reversed in an embodiment. In such an embodiment, a front display panel would include the contrast pixels 217, and the back display panel would include the color pixels 117. In such an embodiment, generating color image data 804 may include utilizing external input image data and positional data (e.g., positional data 336 of FIG. 6) to generate color image data. Generating color image data 804 would include the expansion of external input image data or image data based on the external input image data instead of the step generating contrast image data 806.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A display device comprising:

a first display panel having color pixels;

a second display panel having contrast pixels, the first display panel and the second display panel being positioned in a stacked configuration, and each of the color pixels overlapping with at least one contrast pixel in a plan view;

an image processing unit configured to:

receive external input image data, generate color image data for the first display panel based on the external input image data, and generate contrast image data for the second display panel based on the external input image data, wherein the image processing unit generates the contrast image data by applying an expansion based on the viewing position to the external input image data, the viewing position being a position of a person viewing the display device, the color pixels are controlled according to the color image data, and the contrast pixels are controlled according to the modified contrast image data, the expansion includes expanding the external input image data along a first direction based on the viewing position, and the expansion includes expanding the external input image data along a second direction based on the viewing position, the second direction being different from the first direction.

2. The display device of claim 1, wherein the color image data is generated without the expansion based on the viewing position.

3. The display device of claim 1, wherein the image processing unit is configured to:

determine a reference point based on the viewing position, the reference point being a point along a plane of the display device that overlaps with the viewing position in a direction perpendicular to the plane of the display device, and generate the contrast data by applying the expansion to the external input image data with the reference point as a center point of the expansion.

4. The display device of claim 1, wherein the image processing unit is configured to:

determine a viewing distance that is a distance between the display device and the viewing position, and generate the contrast image data by applying the expansion to the external input image data so as to expand the external input image data by an expansion amount, the expansion amount being based on the viewing distance and a gap distance between the first display panel and the second display panel.

5. The display device of claim 1, wherein the image processing unit is configured to:

generate the contrast image data based on the external input image data, the first viewing position, and a second viewing position, the second viewing position being a position of a second person viewing the display device, and generate the contrast image data by applying the first expansion based on the first viewing position and applying a second expansion based on the second viewing position to the external input image data.

6. The display device of claim 5, wherein the image processing unit is configured to:

determine a first reference point based on the first viewing position and determine a second reference point based on the second viewing position, the first reference point being a point along a plane of the display device that overlaps with the viewing position in a direction perpendicular to the plane of the display device, and the second reference point being a point along the plane of the display device that overlaps with the second viewing position in the direction perpendicular to the plane of the display device, and the first reference point having a different location than the second reference point, and generate the contrast image data by applying the first expansion with the first reference point being a center point of the first expansion and applying a second expansion with the second reference point being a center point of the second expansion to the external input image data.

7. The display device of claim 1, further comprising:

a sensing device that detects the position of the person viewing the display device, the sensing device generating the viewing position based on the detected position of the person.

8. The display device of claim 7, wherein the sensing device is a camera.

9. The display device of claim 1, wherein a sensing device detects a first position of a first person viewing the display device and a second position of a second person viewing the second person, the sensing device generating a first viewing position based on the detected first position of the first person and a second viewing position based on the detected second position of the second person, and the first viewing position or the second viewing position is selected as the viewing position for generating the contrast image data, and the first viewing position or the second viewing position that is not selected is not used to generate the contrast image data.

10. A display device comprising:

a first display panel having color pixels, a second display panel having contrast pixels, the first display panel and the second display panel being positioned in a stacked configuration, the number of the contrast pixels being equal to the number of the color pixels, an image processing unit configured to:

receive external input image data including edge image data, the edge image data corresponding to an edge portion of the image to be displayed by the display device, generate color image data for the first display panel based on the external input image data, and generate contrast image data for the second display panel based on the external input image data, wherein the image processing unit generates the contrast image data or the color image data by applying an expansion based on the viewing position to the external input image data, the viewing position being a position of a person viewing the display device, the color pixels are controlled according to the color image data to provide a color image, and the contrast pixels are controlled according to the contrast image data to provide a contrast image, and the color image includes an edge portion based on the edge image data, the contrast image does not include a portion based on the edge image data.

11. The display device of claim 10, wherein the edge of the display device comprises a first portion that extends in a first direction and a second portion that extends in a second direction, the second direction being perpendicular to the first direction.

12. The display device of claim 10, wherein the external input image data includes inner image data corresponding to an inner portion of the image to be displayed that is adjacent to the edge portion and along an inner side of the edge portion relative to the edge of the display device, and the color image includes the edge portion based on the edge image data and an inner edge portion based on the inner image data, the inner edge portion being adjacent to the edge portion and along an inner side of the edge portion relative to an edge of the first display panel, the contrast image including an edge portion based on the inner image data that is along an edge of the second display panel.

13. A method of displaying an image on a display device, the display device comprising a first display panel and a second display panel positioned in a stacked configuration, the first display panel having color pixels, and the second display panel having contrast pixels, the method comprising:

determining a reference point based on a viewing position, the viewing position being a position of a person viewing the display device, and the reference point being a point along a plane of the display device that overlaps with the viewing position in a direction perpendicular to the plane of the display device;

generating color image data for the first display panel based on external input image data;

generating contrast image data for the second display panel based on the external input image data and the viewing position; and controlling the color pixels of the first display panel according to the color image data and the contrast pixels of the second display panel according to contrast image data, wherein generating the contrast image data includes applying an expansion based on the viewing position to the external input image data with the reference point as a center point of the expansion.

14. The display device of claim 13, wherein applying the expansion includes expanding the external input image data along a first direction.

15. The method of claim 14, wherein applying the expansion includes expanding the external input image data along a second direction, the second direction being different than the second direction.

16. The method of claim 13, further comprising:

determining a viewing distance that is a distance between the display device and the viewing position, wherein the expansion expands the external input image data by an expansion amount, the expansion amount being based on the viewing distance and a gap distance between the first display panel and the second display panel.

17. The method of claim 13, further comprising:

sensing a position of the person viewing the display device, and generating the viewing position based on the sensed position of the person.

* * * * *